US008738981B2

(12) United States Patent
Gorokhov et al.

(10) Patent No.: US 8,738,981 B2
(45) Date of Patent: May 27, 2014

(54) METHOD AND APPARATUS FOR H-ARQ SCHEDULING IN A WIRELESS COMMUNICATION SYSTEM

(75) Inventors: Alexei Y. Gorokhov, San Diego, CA (US); Jilei Hou, Carlsbad, CA (US)

(73) Assignee: Qualcomm Incorporated, San Diego, CA (US)

( * ) Notice: Subject to any disclaimer, the term of this patent is extended or adjusted under 35 U.S.C. 154(b) by 1102 days.

(21) Appl. No.: 12/580,128

(22) Filed: Oct. 15, 2009

(65) Prior Publication Data

US 2010/0107028 A1 Apr. 29, 2010

Related U.S. Application Data

(60) Provisional application No. 61/108,307, filed on Oct. 24, 2008.

(51) Int. Cl.
*H04L 1/18* (2006.01)
*G08C 25/02* (2006.01)

(52) U.S. Cl.
USPC ........... 714/749; 375/211; 375/346; 375/377; 342/458; 714/751; 714/780; 714/758

(58) Field of Classification Search
USPC .......... 375/211, 346, 377; 714/749, 751, 758, 714/780
See application file for complete search history.

(56) References Cited

U.S. PATENT DOCUMENTS

| | | | | |
|---|---|---|---|---|
| 6,167,030 A * | 12/2000 | Kilkki et al. | ............... | 370/236 |
| 6,192,249 B1 * | 2/2001 | Padovani | ............... | 455/453 |
| 6,654,926 B1 * | 11/2003 | Raphaeli et al. | ............... | 714/780 |
| 7,321,940 B1 * | 1/2008 | Smith et al. | ............... | 709/240 |
| 2002/0061080 A1 * | 5/2002 | Richards et al. | ............... | 375/346 |
| 2002/0089451 A1 * | 7/2002 | Wang et al. | ............... | 342/458 |
| 2002/0176362 A1 * | 11/2002 | Yun et al. | ............... | 370/236 |
| 2003/0145269 A1 * | 7/2003 | Kuo et al. | ............... | 714/749 |

(Continued)

FOREIGN PATENT DOCUMENTS

CN 1838583 A 9/2006

OTHER PUBLICATIONS

Figueira, "A schedulability condition for deadline-ordered service disciplines", Apr. 1997, IEEE, vol. 5 No. 2, pp. 232-244.*

(Continued)

*Primary Examiner* — Joshua P Lottich
*Assistant Examiner* — Jeison C Arcos
(74) *Attorney, Agent, or Firm* — Florin Corie

(57) ABSTRACT

Systems and methodologies are described herein that facilitate Hybrid Automatic Repeat Request (H-ARQ) scheduling and coordination in a wireless communication system. As described herein, a network node capable of cooperation with other nodes for communication to respective users can coordinate a cooperation strategy across nodes based on a H-ARQ protocol to be utilized for a given user. In the case of a synchronous H-ARQ protocol, communication can be scheduled as described herein such that initial transmissions to a user are conducted cooperatively and re-transmissions are conducted without inter-node cooperation. In the case of a H-ARQ protocol utilizing persistent assignments, transmission intervals can be calculated and utilized based on application latency requirements, backhaul link latency, or other factors. In the case of an asynchronous H-ARQ protocol, repeat transmissions can be coordinated in a similar manner to initial transmissions or conducted without inter-node cooperation based on latency sensitivity of an associated application.

50 Claims, 15 Drawing Sheets

(56) References Cited

U.S. PATENT DOCUMENTS

| | | | | |
|---|---|---|---|---|
| 2003/0217319 | A1* | 11/2003 | Tripathi et al. | 714/751 |
| 2004/0073626 | A1* | 4/2004 | Major et al. | 709/217 |
| 2005/0276249 | A1* | 12/2005 | Damnjanovic et al. | 370/335 |
| 2006/0067394 | A1* | 3/2006 | Chen | 375/229 |
| 2007/0104130 | A1* | 5/2007 | Venkatachalam | 370/329 |
| 2007/0113138 | A1 | 5/2007 | Kwon et al. | |
| 2007/0153923 | A1* | 7/2007 | Pi et al. | 375/260 |
| 2007/0168827 | A1* | 7/2007 | Lohr et al. | 714/749 |
| 2007/0177569 | A1* | 8/2007 | Lundby | 370/349 |
| 2007/0189205 | A1* | 8/2007 | Terry et al. | 370/328 |
| 2008/0107197 | A1* | 5/2008 | Jen | 375/260 |
| 2008/0253326 | A1* | 10/2008 | Damnjanovic | 370/329 |
| 2008/0298387 | A1* | 12/2008 | Lohr et al. | 370/467 |
| 2009/0086657 | A1* | 4/2009 | Alpert et al. | 370/310 |
| 2009/0168708 | A1* | 7/2009 | Kumar et al. | 370/329 |
| 2011/0280140 | A1* | 11/2011 | Chin et al. | 370/252 |

OTHER PUBLICATIONS

Karmokar, "Cross-Layer Rate and Power Adaptation Strategies for IR-HARQ Systems of Fading Channels with Memory: a SMDP-Based Approach", Aug. 2008, IEEE, vol. 56 No. 8, pp. 1-14.*

Cerutti, "Delay Model of Single-Relay Cooperative ARQ Protocols in Slotted Radio Networks with Non-Instantaneous Feedback and Poisson Frame Arrivals", 2007, IEEE, pp. 2276-2280.*

Dottling, "Hybrid ARQ and Adaptive Modulation and Coding Schemes for High Speed Downlink Packet Access", 2002, Siemens, pp. 1-5.*

Korhonen, "HSDPA—An Introduction" 2004, TTPCOM, pp. 1-16.*

Puttonen, "Mixed Traffic Packet Scheduling in Ultra Long Term Evolution Downlink" Jun. 2008, IEEE, pp. 1-5.*

Jungnickel, "Synchronization of Cooperative Base Stations", Sep. 2008, IEEE, pp. 329-334.*

Puttonen, "Voice-over-IP Performance in Ultra Long Term Evolution Downlink" Feb. 2008, IEEE, pp. 2502-2506.*

Yarali, "WiMAX: The Innovative Broadband Wireless Access Technology", Apr. 2008, Murray State University, pp. 53-63.*

Alcatel, "Impact of UL CoMP to HARQ operations", May 2009, 3GPP RAN WG2, p. 1-3.*

Alcatel, "Efficient uplink coordinated multi-point reception with reduced backhauling cost", Jun. 2009, 3GPP, p. 1-4.*

Ericsson: "LTE-Advanced—Coordinated Multipoint transmission/reception." 3GPP Draft TSG-RAN WG1 #53bis; R1-082469; Warsaw, Poland; (Jun. 30, 2008), XP050110740.

Fujitsu: "Discussion on DL coordinated multipoint transmission" 3GPP Draft TSG-RAN1 #54; R1-083115, Jeju, Korea, (Aug. 18-22, 2008), XP050316556, p. 4, paragraph 2.

Fujitsu: "UL CoMP HARQ Processing." 3GPP Draft TSG-RAN WG2 Meeting #67bis; R2-095907, Miyazaki, Japan; (Oct. 12, 2009), XP050390358.

International Search Report & Written Opinion—PCT/US09/061728, International Search Authority—European Patent Office—(Mar. 2, 2010).

Ericsson, "Framework for DC-HSDPA Operation", [online], 3GPP TSG-RAN WG1 #53, May 14, 2008, R1-081884, [retrieved on Oct. 4, 2011], Retrieved from the Internet: <URL: http://www.3gpp.org/ftp/tsg_ran/WG1_RL1/TSGR1_53/Docs/R1-081884.zip>(2011-10024-169).

Ericsson, "LTE-Advanced—Coordinated Multipoint transmission/reception" 3GPP Draft; R1-083069 {Comp}, 3rd Generation Partnership Project (3GPP), Mobile Competence Centre; 650, Route Des Lucioles; F-06921 Sophia-Antipolis Cedex France, No. Jeju; Aug. 13, 2008, XP050316512.

Huawei: "Inter-eNB and Intra-eNB Schemes for CoMP in LTE-Advanced", 3GPP Draft TSG RAN WG#54; R1-083050, 3rd Generation Partnership Project (3GPP), Jeju, Korea, (Aug. 18-22, 2008).

Taiwan Search Report—TW098136012—TIPO—Mar. 27, 2013.

* cited by examiner

METHOD AND APPARATUS FOR H-ARQ SCHEDULING IN A WIRELESS COMMUNICATION SYSTEM

CROSS-REFERENCE

This application claims the benefit of U.S. Provisional Application Ser. No. 61/108,307, filed Oct. 24, 2008, and entitled "H-ARQ FEEDBACK IN DOWNLINK NETWORK MIMO," the entirety of which is incorporated herein by reference.

BACKGROUND

I. Field

The present disclosure relates generally to wireless communications, and more specifically to techniques for scheduling transmissions in a wireless communication environment.

II. Background

Wireless communication systems are widely deployed to provide various communication services; for instance, voice, video, packet data, broadcast, and messaging services can be provided via such wireless communication systems. These systems can be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems.

As the demand for high-rate and multimedia data services rapidly grows, there has been an effort toward implementation of efficient and robust communication systems with enhanced performance. For example, in recent years, users have started to replace fixed line communications with mobile communications and have increasingly demanded great voice quality, reliable service, and low prices. In addition to mobile telephone networks currently in place, a new class of small base stations has emerged, which can be installed in the home of a user and provide indoor wireless coverage to mobile units using existing broadband Internet connections. Such personal miniature base stations are generally known as access point base stations, or, alternatively, Home Node B (HNB) or Femto cells. Typically, such miniature base stations are connected to the Internet and the network of a mobile operator via a Digital Subscriber Line (DSL) router, cable modem, or the like.

Wireless communication systems can be configured to include a series of wireless access points, which can provide coverage for respective locations within the system. Such a network structure is generally referred to as a cellular network structure, and access points and/or the locations they respectively serve in the network are generally referred to as cells.

Further, in a multiple-in-multiple-out (MIMO) communication system, multiple sources and/or destinations (e.g., corresponding to respective antennas) can be utilized for the transmission and reception of data, control signaling, and/or other information between devices in the communication system. The use of multiple sources and/or destinations for respective transmissions in connection with a MIMO communication system has been shown to yield higher data rates, improved signal quality, and other such benefits over single-input and/or single-output communication systems in some cases. One example of a MIMO communication system is a Network MIMO (N-MIMO) or Coordinated Multipoint (CoMP) system, in which a plurality of cells can cooperate to exchange information with one or more receiving devices, such as user equipment units (UEs) or the like. In addition, Automatic Repeat Request (ARQ) and/or Hybrid ARQ (H-ARQ) transmission can be utilized, in which information can be re-transmitted to a given user subsequent to an initial transmission of the information under various conditions (e.g., erroneously received or non-received packets, etc.) in order to increase the accuracy of information transmitted to the user. To the furtherance of at least the above ends, it would be desirable to implement mechanisms by which H-ARQ can be coordinated between respective network cells in a N-MIMO communication system.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

According to an aspect, a method is described herein. The method can comprise identifying a Hybrid Automatic Repeat Request (H-ARQ) protocol to be utilized for communication with one or more users and selecting a cooperation strategy to be utilized across respective network nodes for communication with the one or more users based at least in part on the H-ARQ protocol A second aspect described herein relates to a wireless communications apparatus, which can comprise a memory that stores data relating to a user equipment unit (UE) served by the wireless communications apparatus and a H-ARQ protocol configured for communication with the UE. The wireless communications apparatus can further comprise a processor configured to configure a cooperation strategy to be utilized by the wireless communications apparatus and one or more associated network nodes for communication with the UE based at least in part on the H-ARQ protocol configured for communication with the UE.

A third aspect relates to an apparatus, which can comprise means for identifying a H-ARQ scheme utilized for communication with an associated terminal and means for coordinating with one or more associated network nodes to facilitate transmission to the associated terminal based at least in part on a H-ARQ scheme utilized for communication with the associated terminal.

A fourth aspect relates to a computer program product, which can comprise a computer-readable medium that comprises code for causing a computer to identify a H-ARQ scheme utilized for communication with a UE and code for causing a computer to coordinate with one or more associated network nodes to facilitate transmission to the UE based at least in part on a H-ARQ scheme utilized for communication with the UE.

To the accomplishment of the foregoing and related ends, one or more aspects of the claimed subject matter comprise the features hereinafter fully described and particularly pointed out in the claims. The following description and the annexed drawings set forth in detail certain illustrative aspects of the claimed subject matter. These aspects are indicative, however, of but a few of the various ways in which

DETAILED DESCRIPTION

Figure 1:
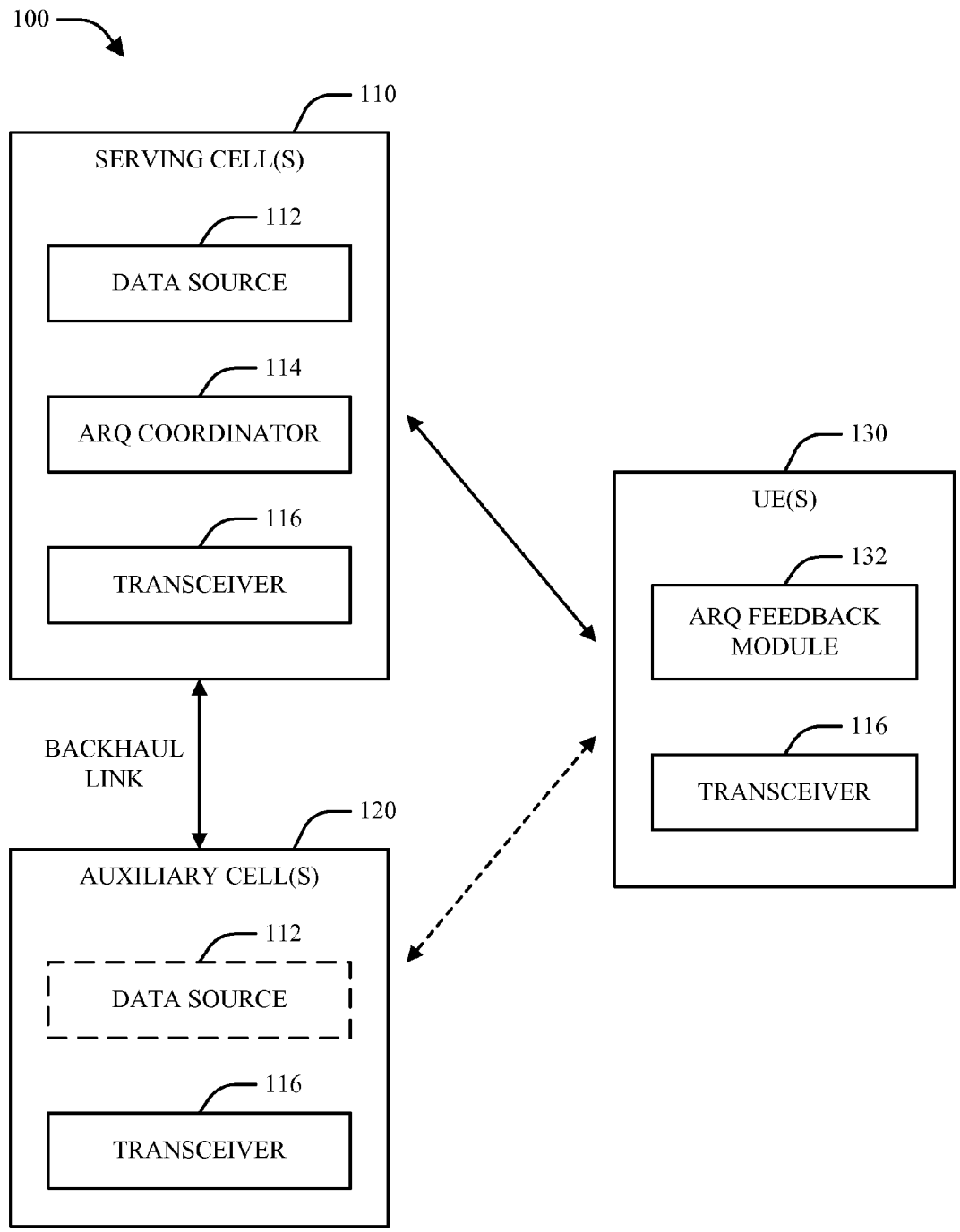
FIG. 1 is a block diagram of a system for coordinating cooperative transmissions between respective network cells and user devices in accordance with various aspects.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point or Node B) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Further, CDMA2000 and UMB are described in documents from an organization named "3rd Generation Partnership Project 2" (3GPP2).

Various aspects will be presented in terms of systems that can include a number of devices, components, modules, and the like. It is to be understood and appreciated that the various systems can include additional devices, components, modules, etc. and/or can not include all of the devices, components, modules etc. discussed in connection with the figures. A combination of these approaches can also be used.

Referring now to the drawings, FIG. 1 illustrates a system 100 for coordinating cooperative transmissions between respective network cells 110-120 and respective user equipment units (UEs) 130 in accordance with various aspects. As FIG. 1 illustrates, system 100 can include respective UEs 130 and/or other suitable user devices that can communicate with one or more associated network cells, such as serving cell(s) 110 and auxiliary cell(s) 120. In one example, a serving cell 110 for a given UE 130 can provide one or more communication services to UE 130 with any suitable degree of cooperation from respective auxiliary cells 120. However, while the terms "serving cell" and "auxiliary cell" are used to refer to cells 110-120, it should be appreciated that no specific functionality of cells 110-120 is intended to be implied by such naming. For example, an auxiliary cell 120 can serve a UE 130 in addition to, or in place of, a serving cell 110 in some cases. In one example, respective cells 110-120 can correspond to and/or provide communication coverage for any suitable coverage area, such as an area associated with a macro cell, a femto cell (e.g., an access point base station or Home Node B (HNB)), and/or any other suitable type of coverage area.

In accordance with one aspect, a given UE 130 can communicate with any suitable number of serving cells 110 and/or auxiliary cells 120. For example, a UE 130 can conduct one or more uplink (UL, also referred to as reverse link (RL)) communications to cell(s) 110-120, and respective cells 110-120 can conduct one or more downlink (DL, also referred to as forward link (FL)) communications to a UE 130. In one example, system 100 can utilize one or more network multiple-in-multiple-out (Network MIMO or N-MIMO), coordinated multipoint (CoMP), and/or other techniques, by which a single UE 130 is enabled to communicate with a plurality of disparate cells 110-120 (e.g., one or more serving cells 110 and one or more auxiliary cells 120) and/or sectors thereof. In another example, N-MIMO communication as performed within system 100 can leverage any suitable strategy for cooperation between cells 110-120 or combination thereof. Such strategies can include, for example, silencing, frequency reuse, coordinated beamforming (CBF), joint transmission (JT), and/or any other suitable cooperation strategies as described herein and/or as generally known in the art.

In accordance with another aspect, system 100 can utilize a downlink (DL) N-MIMO framework. Such a framework can be based on, for example, cooperative transmission(s) from multiple network nodes (e.g., cells, access points, Node Bs or Evolved Node Bs (eNodeBs or eNBs)) such as serving cell(s) 110 and/or auxiliary cell(s) 120 to one or more UEs 130 such that inter-node interference is minimized and/or channel gain corresponding to multiple nodes is combined at receiving UE(s) 130. As noted above and generally herein, cooperation between respective cells 110-120 in system 100 can take various forms. For example, cooperative silencing can be utilized, wherein a cell 110-120 or other node avoids transmitting on time, frequency, and/or resources in order to minimize interference caused to a UE 130 served by a neighbor node if the UE 130 is relatively close (e.g., in terms of radio frequency (RF) channel strength) to the former node. In one example, a soft version of cooperative silencing can be utilized, wherein a reduction in transmit power is applied in lieu of complete avoidance of transmission.

Another example of cooperation that can be performed within system 100 as noted above and generally herein is CBF (or cooperative transmit interference nulling), wherein a cell 110-120 or other node selects a transmit beam with the goal of radiating energy in the direction of a served UE 130 (e.g., as in traditional non-cooperative beamforming) while simultaneously reducing energy radiated in the direction of other UEs 130 served by neighbor node(s) on the same resources in time, frequency, or the like.

In a further example given above and generally described herein, joint processing or JT can be utilized, wherein a data packet is transmitted to a UE 130 from multiple cells 110-120 and/or other nodes to achieve interference mitigation as well as coherent combining of channel gains of the relevant transmit antennas from the cooperating nodes. In such an example, data packets to be transmitted to a UE 130 can be stored and/or otherwise obtained by a data source 112 at a serving cell 110 for the UE 130. The data packets can be provided to auxiliary cell(s) 120 via a backhaul link between serving cell(s) 110 and auxiliary cell(s) 120 and/or stored at an independent data source 112 at auxiliary cell 120. Subsequently, respective transceivers 116 at cells 110-120 can cooperate to transmit respective data packets to UE 130, which can be received and/or otherwise processed at UE 130 by a transceiver 116 associated with UE 130. While not shown in system 100, it should be appreciated that uplink (UL) joint transmission could similarly be conducted within system 100 for transmissions from UE 130 to multiple disparate cells 110-120.

In accordance with a further aspect, one or more Automatic Repeat Request (ARQ) techniques (e.g., Hybrid ARQ (H-ARQ), etc.) can be utilized within system 100 to improve the reliability of information transmitted within system 100. For example, an ARQ coordinator 114 and/or other mechanisms associated with a serving cell 110 for a given UE 130 can be utilized by the serving cell 110 to facilitate the repeat transmission of respective data packets and/or other information upon determining that such information was not adequately received at the UE 130. In one example, ARQ coordinator 114 can determine whether information has been received at UE 130 based at least in part on feedback received from an ARQ feedback module 132 associated with UE 130. Feedback provided by ARQ feedback module 132 can include, for example, acknowledgement (ACK) signaling, negative acknowledgement (NACK) signaling, or the like.

In one example, in order to facilitate cooperative transmission within system 100, scheduling decisions can be communicated between respective cooperating cells 110-120 and/or other cooperating nodes. Further, in the presence of synchronous H-ARQ or persistent assignments, various mechanisms can be utilized as described herein to ensure that each cooperating node in system 100 is aware of the packet termination status of respective UEs 130 that are the subject of cooperation and/or subsequent assignment(s) on the same resources.

Further, with respect to the forms of cooperation that can be utilized by cells 110-120 as generally described herein, it can be appreciated that mechanisms should be incorporated in order to enable cooperating nodes to obtain the most up-to-date information regarding the scheduling status of respective associated UEs 130. For example, in the case of (soft) silencing, up-to-date scheduling information can be utilized to enable cooperating nodes to null (or reduce) their transmission power only on the resource(s) and/or time instance(s) (e.g., sub-frame(s)) where a particular UE 130 is being served. In such an example, it can be appreciated that a cooperating node that does not receive H-ARQ feedback (e.g., ACK/NACK signaling) from a UE 130 or a notification of the end of a related persistent assignment before a subsequent H-ARQ retransmission may in some cases not know whether to keep silence. As a result, a cooperating node can elect to keep silence until it receives H-ARQ feedback and/or subsequent scheduling decision(s) occur, which can lead to inefficiency due to silencing more often than needed.

In addition, it can be appreciated that inefficiencies such as those noted above become more prominent as more advanced forms of cooperation (e.g., CBF, JT, etc.) are utilized. For example, a cooperative node can be configured to behave in various manners depending on whether a subsequent packet transmission (e.g., a H-ARQ re-transmission) or a new packet transmission (e.g., to a different UE) is scheduled to take place. In the event that a node fails to comply with its expected behavior, a substantial increase in interference levels, a potential loss of channel combining gain (e.g., in the case of joint processing), and/or other negative results can occur as compared to a case in which feedback is timely received and processed.

In another example, the ability to provide up-to-date information over a backhaul link between respective cells 110-120 can be limited by backhaul latency. By way of specific example, a backhaul link based on a standard Internet Protocol (IP) network can exhibit latencies of up to 10 ms and, in some cases, can reach latencies of up to 100 ms. Thus, in the event that system 100 is configured such that persistent assignments yield a fixed transmission interval of less than 10 ms (e.g., 8 ms), the effects of late arrival of persistent assignment termination notifications can be significant in some scenarios. Similarly, it can be appreciated that late arrival of H-ARQ feedback in the context of synchronous H-ARQ could be a significant limiting factor in systems with H-ARQ retransmission latencies within 10 ms.

In view of at least the above, it can be appreciated that coordination of transmissions across multiple cells 110-120 can be complicated in systems wherein H-ARQ is utilized in combination with CoMP mechanisms. Further, it can be appreciated that for various forms of H-ARQ (e.g., synchronous H-ARQ, asynchronous H-ARQ with persistent assignments, asynchronous H-ARQ without persistent assignments, etc.), different actions may be required in some cases in order to effectively coordinate transmissions within system 100. Thus, in accordance with one aspect, ARQ coordinator 114 at serving cell(s) 110 and/or any other suitable mechanism(s) within system 100 can identify the nature of a H-ARQ process in effect for a given UE 130 (e.g., by identifying a type of H-ARQ utilized from among synchronous H-ARQ, asynchronous H-ARQ with persistent assignments, or asynchronous H-ARQ without persistent assignments), such that N-MIMO communication with the UE 130 can be coordinated to accommodate the specific H-ARQ mechanism(s) being utilized. Specific examples of manners in which N-MIMO communication can be adjusted based on a utilized H-ARQ protocol are provided in further detail in the following description.

Figure 2:
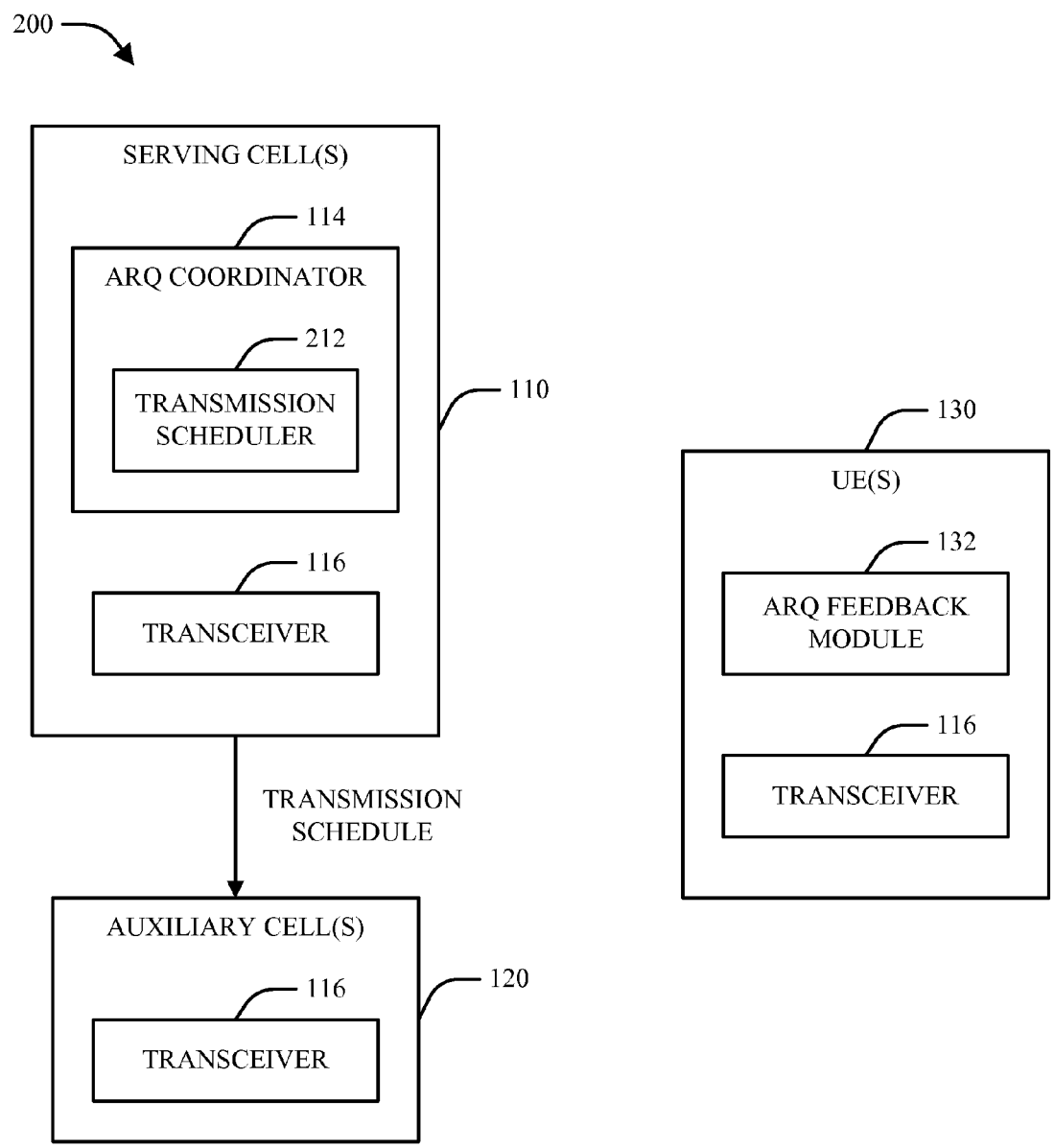
FIG. 2 is a block diagram of a system for scheduling respective synchronous H-ARQ transmissions within a wireless communication environment in accordance with various aspects.

Turning to FIG. 2, a system 200 is illustrated that can be utilized to facilitate coordination of N-MIMO or CoMP communication for a synchronous H-ARQ scenario. As FIG. 2 illustrates, system 200 can include one or more serving cells 110 and one or more auxiliary cells 120, across which coordinated transmission(s) can be conducted to one or more UEs 130. Further, as noted above, system 200 can utilize synchronous H-ARQ, wherein data is re-transmitted by cells 110 and/or 120 upon reception of signaling provided by a UE 130 (e.g., via an ARQ feedback module 132) requesting a repeat transmission. However, in a scenario in which ACK signaling and/or other suitable signaling provided by ARQ feedback module 132 is not readily decodable by all coordinating cells 110-120, difficulty can in some cases be encountered in coordinating synchronous H-ARQ across the respective cells 110-120. For example, in the event that a backhaul link between respective cells 110-120 is sufficiently low in latency (e.g., on the order of tens of milliseconds) and a channel associated with UE 130 is not rapidly changing, respective transmissions to UE 130 can be pre-scheduled. However, in such a scenario, it can in some cases be difficult to reliably process ARQ feedback from UE 130 and redefine coordination for subsequent packets across all coordinating cells 110-120 in an amount of time that is sufficiently small to enable subsequent transmissions of missed information under a synchronous H-ARQ scheme.

Accordingly, to facilitate improved coordination of transmissions across cells 110-120 in a synchronous H-ARQ scheme, an ARQ coordinator 114 utilized by a serving cell 110 and/or other cell in system 200 can include a transmission scheduler 212, which can be utilized to schedule respective transmissions and/or re-transmissions of data packets to respective UEs 130. As system 200 illustrates, upon determining a schedule for transmissions and/or re-transmissions, the schedule can be relayed to respective cooperating cells 110 and/or 120.

In accordance with one aspect, transmission scheduler 212 can coordinate transmissions by cells 110-120 in connection with synchronous H-ARQ such that cooperation is enabled only for a first H-ARQ transmission for packets that can be scheduled in advance. In one example, transmission scheduler 212 can apply such a scheduling rule across cells 110-120 in connection with any suitable cooperation technique, such as JT, CBF, or the like.

In accordance with another aspect, a scheduling rule as implemented by transmission scheduler 212 can be implemented as follows. Initially, transmission scheduler 212 can pre-schedule packets for one or more UEs 130 at a predefined set of instances $(t_0 + n \cdot L)$ of certain interlaces, $n \in \{1,2, \ldots\}$, where $t_0$ is a starting point and L is the maximum allowed number of H-ARQ transmissions. Based on this pre-scheduling, cooperative transmission between cells 110-120 can be configured to take place only at the predefined instances.

Figure 3:
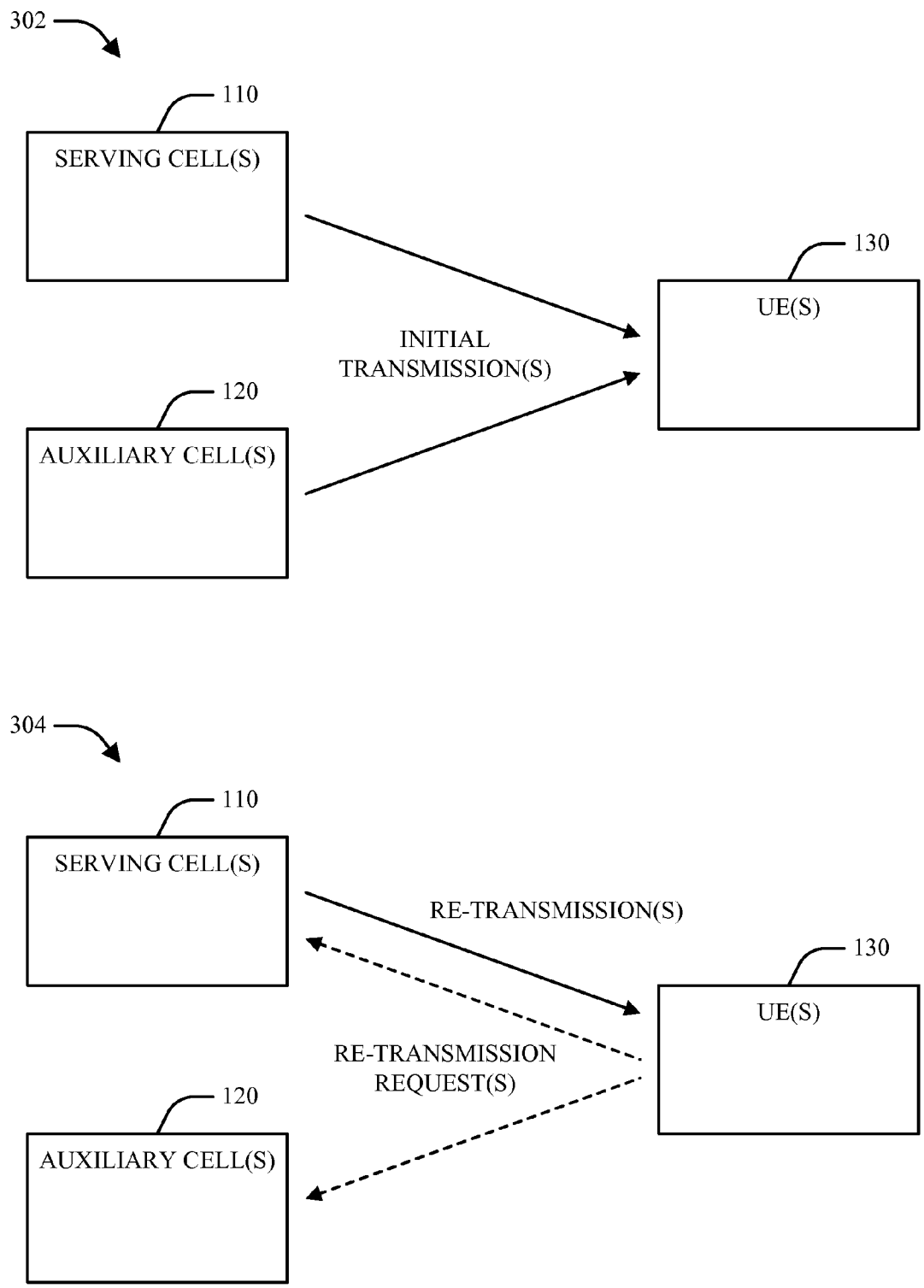
FIG. 3 illustrates an example scheduling technique that can be utilized for synchronous H-ARQ transmission in accordance with various aspects.

Subsequently, if H-ARQ re-transmissions are determined to be required, the re-transmissions can be configured to take place without advanced cooperation. This scheduling technique is illustrated by diagrams 302-304 in FIG. 3, wherein diagram 302 illustrates an initial transmission of data to a UE 130 from multiple cells 110 and 120 and diagram 304 represents a subsequent transmission of the data to the UE 130 by the serving cell 110 for the UE 130 without cooperation from auxiliary cell(s) 120. As further shown in diagram 304, re-transmission(s) of data to UE 130 can be made upon reception of re-transmission request signaling received from the UE 130 (e.g., via an ARQ feedback module 132) at one or more cells 110-120 associated with the initial transmission.

In one example, in the event that a packet requires K H-ARQ transmissions where K<L, other packets can be scheduled within the remaining (L−K) instances of the corresponding interlace until the new packet scheduled for cooperation is transmitted. Further, it can be appreciated that a cell 110 and/or 120 can elect to schedule packets corresponding to UEs 130 that have good channel conditions and do not require multiple H-ARQ instances such that the cell 110 and/or 120 can safely target the first transmission. As a result, transmission scheduler 212 can facilitate the use of cooperation for initial transmissions only (e.g., as illustrated by diagrams 302-304) upon determining that targeting a single transmission will not result in a substantial H-ARQ loss. It can be appreciated that losses due to targeting early termination can be associated with relatively high UE mobility and/or significant unpredictable variation in interference level. However, it can be appreciated that the impact of such factors is limited in cases where advanced cooperation techniques (e.g., JT, CBF, etc.) are utilized. More particularly, it can be appreciated that high UE mobility is not compatible with advanced cooperation techniques due to outdated channel state information at the transmitter (CSIT). Further, it can be appreciated that large interference variations are unlikely in such a scenario. For example, as potential dominant interferers are in most cases involved in cooperation, their interference is generally relatively small and/or predictable. Further, weak (e.g., second tier) interferers are not likely to cause large variations, and any variations caused by weak interferers can in most cases be accounted for by rate prediction with very limited performance loss.

Returning to FIG. 2, it can be appreciated that, in view of the above discussion, transmission scheduler 212 can pre-define assignments such that serving cell(s) 110 and auxiliary cell(s) 120 are transmitting respective packets to UE(s) 130 in a cooperative fashion on a given set of resources. If respective packets are successfully received at UE(s) 130, transmission scheduler 212 can continue without performing further action. Otherwise, transmission scheduler 212 can re-schedule subsequent transmission(s) of unsuccessful packets solely by serving cell(s) 110 in a non-cooperative setup. Stated another way, predefined instances can be defined where initial transmissions occur, which can be coordinated ahead of time by transmission scheduler 212. For such transmissions, serving cell(s) 110 can facilitate transfer of data packets that are to be transmitted by all cells 110-120. Subsequently, cooperation with auxiliary cell(s) 120 can be done only for a single transmission, such that serving cell(s) 110 assume full responsibility for packet termination.

Figure 4:
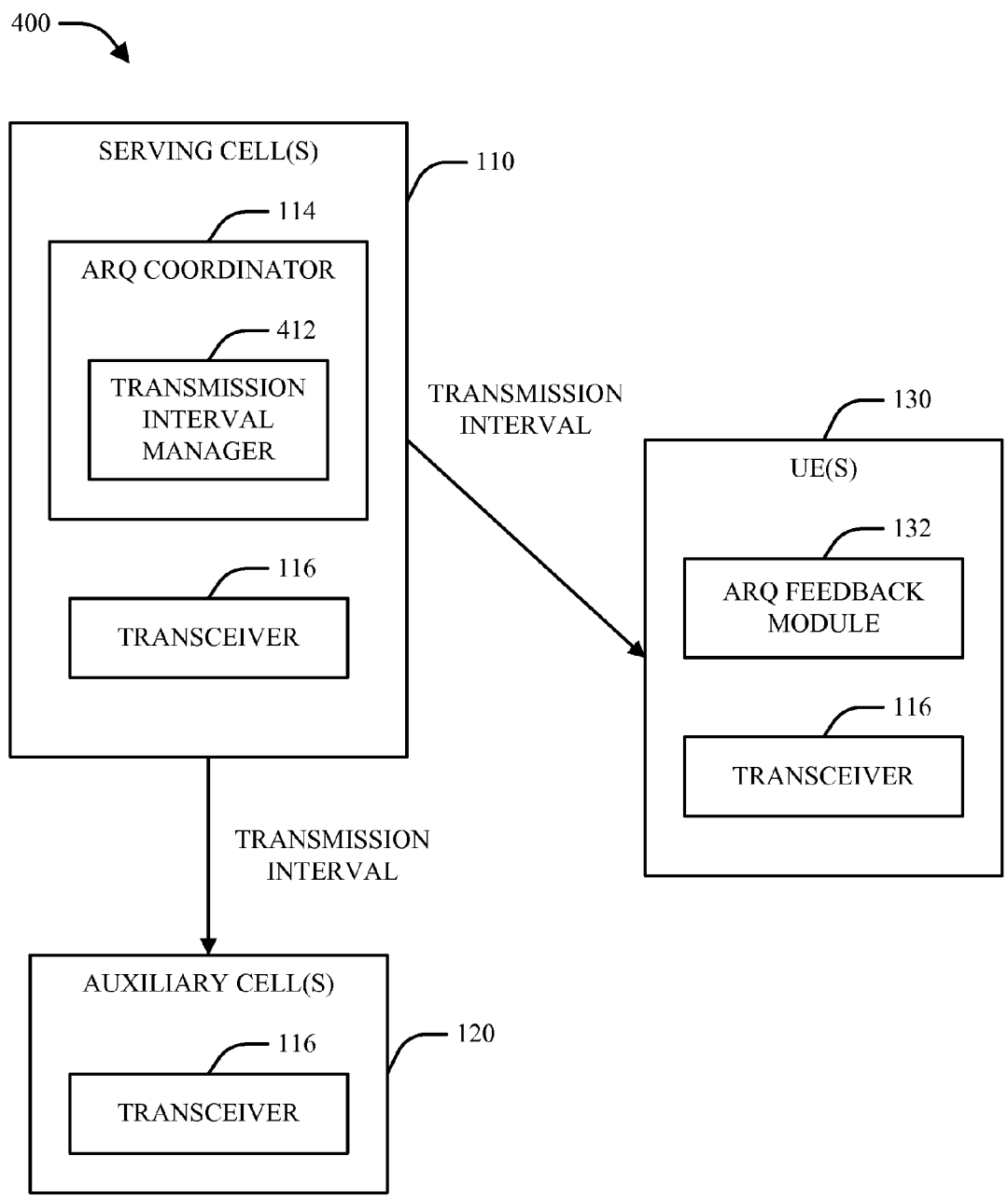
FIG. 4 is a block diagram of a system for scheduling asynchronous H-ARQ transmissions associated with respective persistent assignments in accordance with various aspects.

Referring next to FIG. 4, a system 400 is illustrated that can be utilized to facilitate coordination of N-MIMO or CoMP communication for an asynchronous H-ARQ scenario in which persistent assignments are utilized. As FIG. 4 illustrates, system 400 can include one or more serving cells 110 and one or more auxiliary cells 120, across which coordinated transmission(s) can be conducted to one or more UEs 130. In accordance with one aspect, in order to facilitate cooperative transmission between cells 110-120 in the case of persistent assignments, an ARQ coordinator 114 and/or other means associated with a serving cell 110 for a given UE 130 can utilize a transmission interval manager 412, which can manage transmission intervals utilized for communication with UE 130. In one example, serving cell 110 can provide information relating to relevant transmission interval(s) to auxiliary cell(s) 120 and/or UE(s) 130.

By way of example, it can be appreciated that, in scenarios wherein cooperative transmission is available, transmission of subsequent packets to a UE 130 on a persistent assignment can be configured to take place with an interval that is chosen by transmission interval manager 412 to be no less than the expected (e.g., tail) backhaul latency. Accordingly, it can be appreciated that regular transmission of new packets (e.g., a new packet transmission every 8 ms) may not be suitable in some cases. In one example, a transmission interval for a persistent assignment can be defined by transmission interval manager 412 as a parameter (e.g., signaled as part of the assignment or pre-set for a particular UE 130 based on upper layer signaling or the like). Further, such an interval can be chosen by transmission interval manager 412 depending on UE (e.g., flow) latency requirements, anticipated delay of inter-node communication, and/or other suitable factors.

In another example, transmission interval manager 412 can define two or more different intervals for persistent assignment packet transmission, such as, for example, a short interval and a long interval. The short interval can be fixed to a relatively short length (e.g., 8 ms) and used as long as an associated UE buffer level is expected to be sufficiently large such that termination of a persistent assignment is not likely, if UE latency requirements dictate short periods, if an associated assignment size is relatively small such that resource wastage in the case of lost inter-node coordination is limited, and/or upon other suitable considerations. Additionally or alternatively, the long interval can be enforced on larger assignments if an associated UE buffer is more likely to expire soon.

In accordance with a further aspect, a short transmission interval and a long transmission interval can be utilized in a similar manner to that described above in the case of synchronous H-ARQ and/or asynchronous H-ARQ in various scenarios. For example, a long transmission interval can be utilized in a network implementation wherein a time interval between transmissions is configured to be sufficiently large (e.g., as compared to backhaul delay) so as to allow for coordinated re-transmissions.

Figure 5:
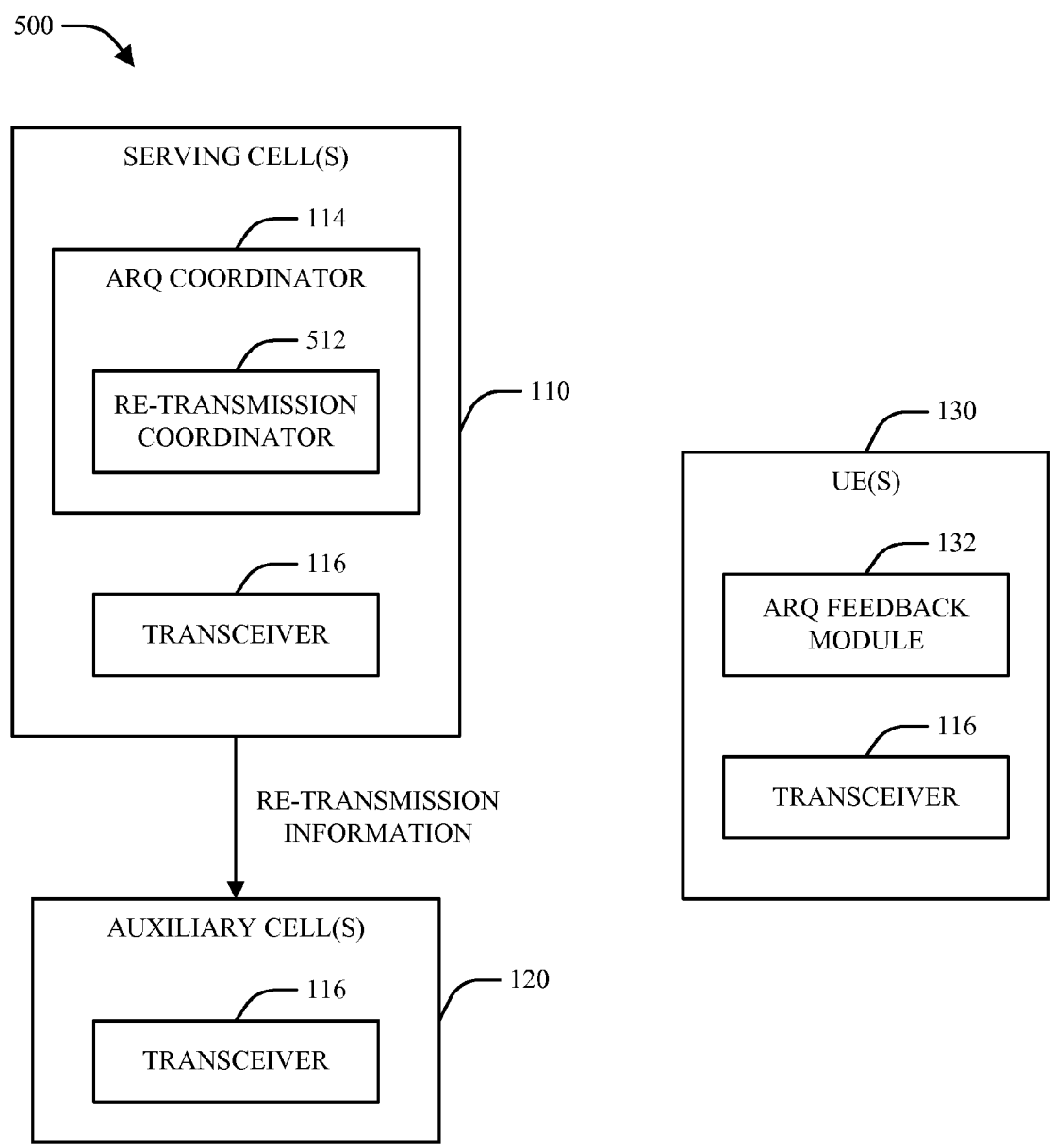
FIG. 5 is a block diagram of a system for scheduling respective asynchronous H-ARQ transmissions within a wireless communication environment in accordance with various aspects.

Turning now to FIG. 5, a system 400 is illustrated that can be utilized to facilitate coordination of N-MIMO or CoMP communication for an asynchronous H-ARQ scenario that does not utilize persistent assignments. As FIG. 5 illustrates, system 500 can include one or more serving cells 110 and one or more auxiliary cells 120, across which coordinated transmission(s) can be conducted to one or more UEs 130. In accordance with one aspect, ARQ coordinator 114 and/or other suitable means at a serving cell 110 for a UE 130 can facilitate the use of an asynchronous H-ARQ protocol in combination with inter-node cooperation techniques between serving cell(s) 110 and auxiliary cell(s) 120. In one example, asynchronous H-ARQ can be carried out using explicit signaling of all transmissions, including redundancy versions of a given packet. For example, a re-transmission coordinator 512 and/or other mechanisms associated with ARQ coordinator 114 can schedule redundancy versions of a given packet and provide re-transmission information corresponding to the packet such that H-ARQ re-transmissions of the packet are sufficiently delayed to ensure that scheduling information relating to the redundancy versions of the packet reach all cooperating nodes in time before the corresponding re-transmissions take place.

In some cases, it can be appreciated that delaying H-ARQ re-transmissions to a substantial degree (e.g., in significant excess of 10 ms) can be detrimental in scenarios (e.g., associated with Voice over Internet Protocol (VoIP) and/or other latency-sensitive applications) where increased packet latency affects user experience. Accordingly, in one example, re-transmission coordinator 512 can enable inter-node cooperation on an initial H-ARQ transmission only and facilitate serving of subsequent re-transmissions without cooperation in a similar manner to that illustrated by diagrams 302 and 304 in FIG. 3.

Referring now to FIGS. 6-9, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 6:
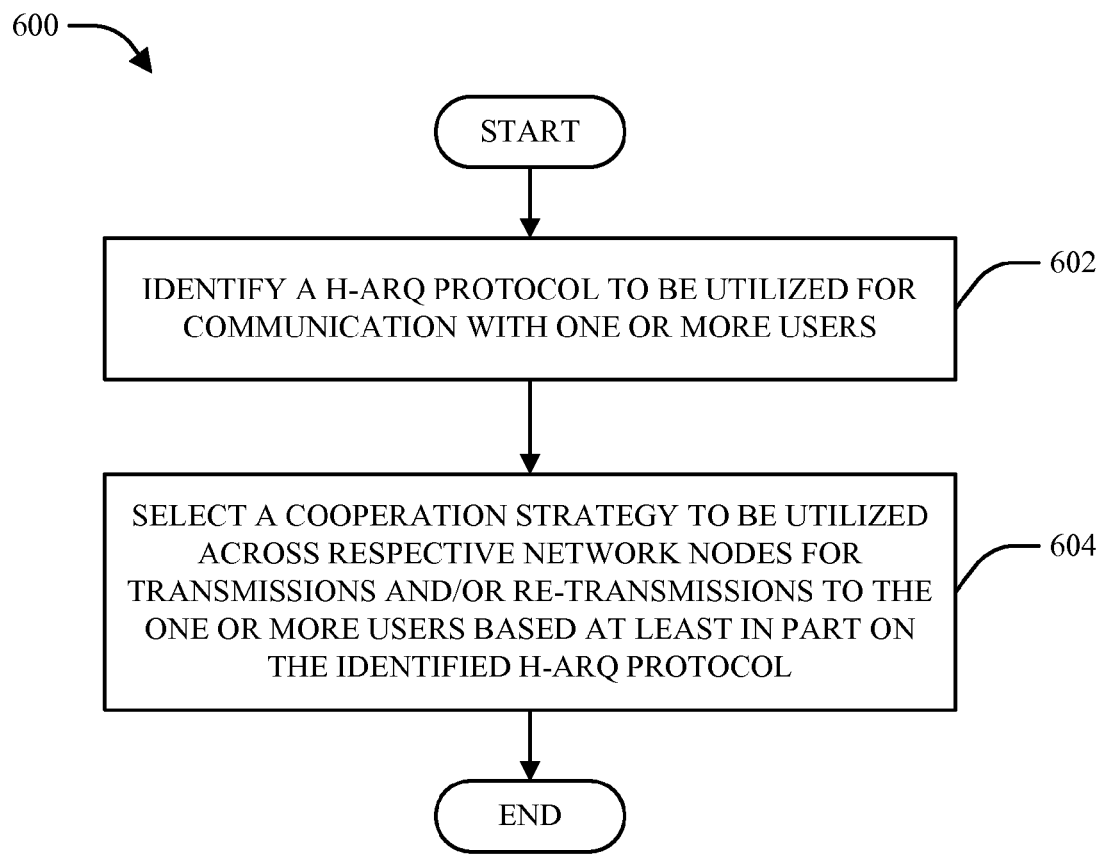
FIGS. 6-9 are flow diagrams of respective methodologies for coordination and scheduling of H-ARQ communication within a N-MIMO system.

With reference to FIG. 6, illustrated is a methodology 600 for coordination and scheduling of H-ARQ communication within a N-MIMO system. It is to be appreciated that methodology 600 can be performed by, for example, a network cell (e.g., a serving cell 110 and/or an auxiliary cell 120 in system 100) and/or any other appropriate network device. Methodology 600 can begin at block 602, wherein a H-ARQ protocol to be utilized for communication with one or more users (e.g., UEs 130) is identified. Methodology 600 can then conclude at block 604, wherein a cooperation strategy to be utilized across respective network nodes (e.g., cells 110-120) for transmissions and/or re-transmissions to the one or more users is selected (e.g., by an ARQ coordinator 114) based at least in part on the H-ARQ protocol identified at block 602. In one example, a cooperation strategy selected at block 604 can be tailored to a synchronous or asynchronous H-ARQ protocol, the presence or absence of persistent resource assignments, and/or other suitable factors as generally described herein and in the following methodologies.

Figure 7:
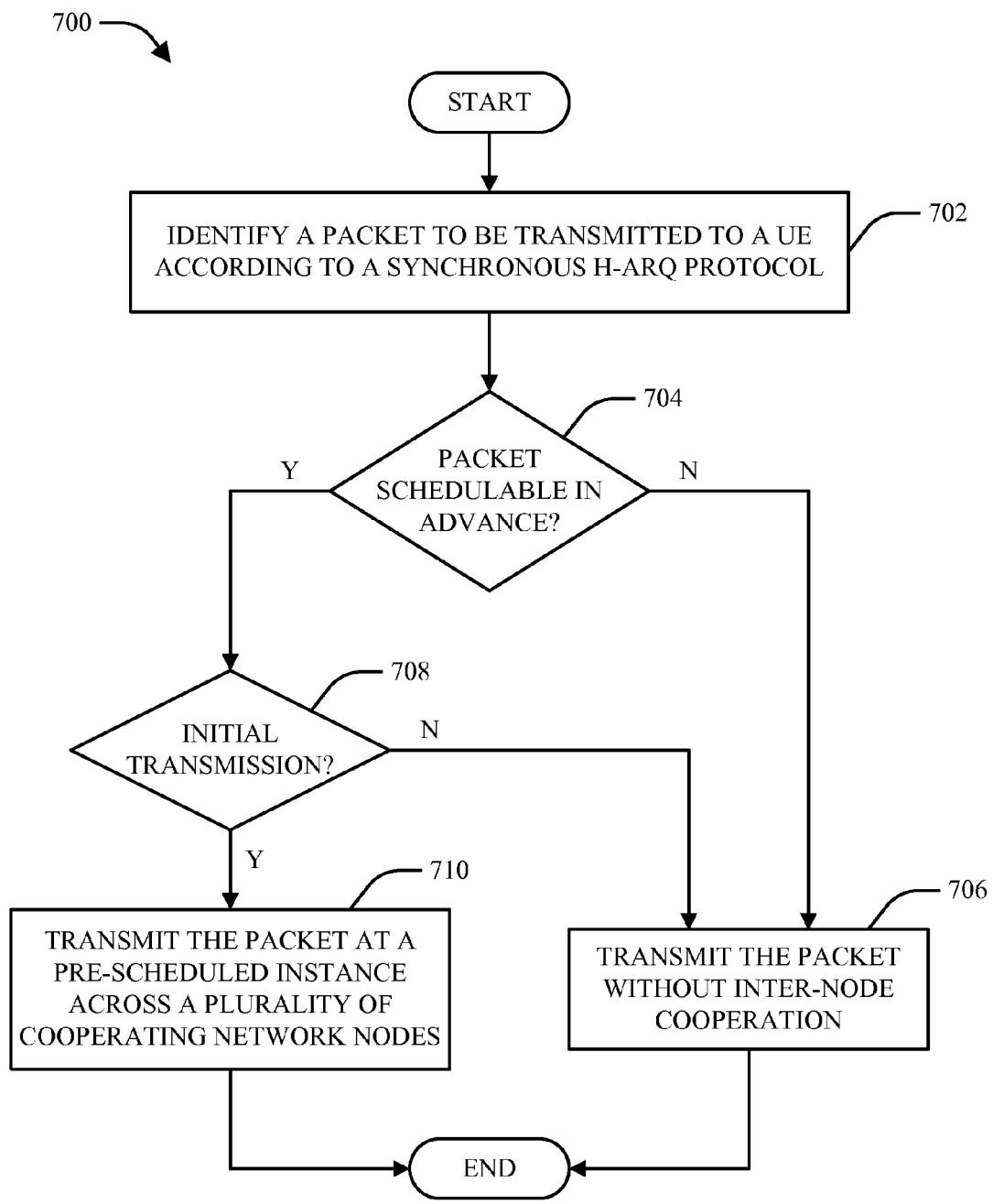

Turning next to FIG. 7, a flow diagram of a methodology 700 for coordinating a cooperative transmission pursuant to a synchronous H-ARQ protocol is illustrated. Methodology 700 can be performed by, for example, a base station and/or any other appropriate network entity. Methodology 700 begins at block 702, wherein a packet to be transmitted to a UE according to a synchronous H-ARQ protocol is identified. Next, at block 704, it is determined whether the packet can be pre-scheduled for transmission. If the packet cannot be scheduled in advance, methodology 700 can conclude at block 706, wherein the packet is transmitted by a network node associated with methodology 700 without inter-node cooperation.

Alternatively, if the packet can be pre-scheduled, methodology 700 can proceed from block 704 to block 708, wherein it is determined whether an initial transmission of the packet is to be conducted (e.g., as opposed to a subsequent or redundancy transmission). If it is determined at block 708 that the transmission is a re-transmission, methodology 700 can conclude at block 706 as described above. Otherwise, methodology 700 can instead conclude at block 710, wherein the packet is transmitted at a pre-scheduled instance (e.g., as scheduled by a transmission scheduler 212) across a plurality of cooperating network nodes.

Figure 8:
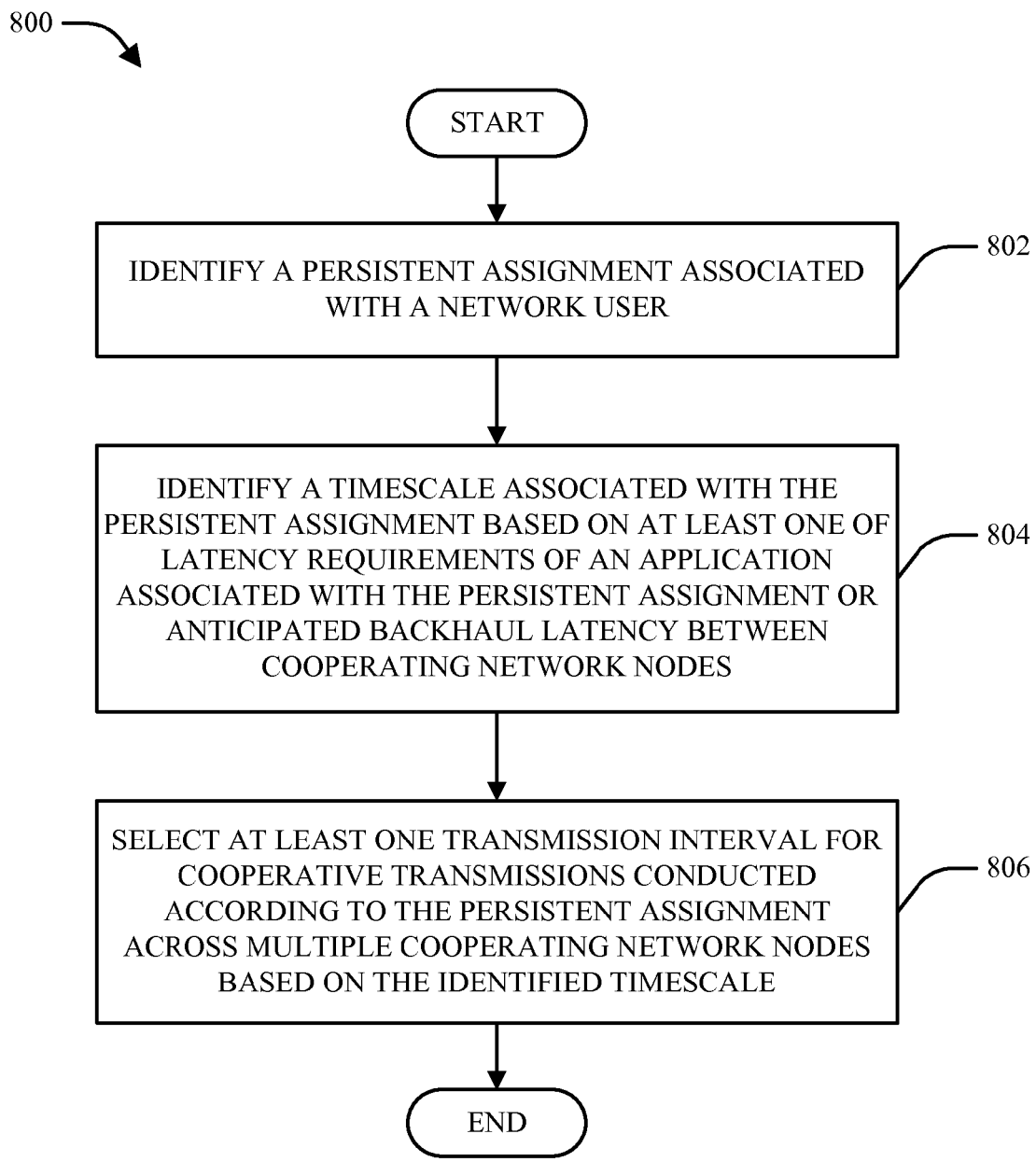

FIG. 8 illustrates a methodology 800 for coordinating a cooperative transmission across network nodes pursuant to respective persistent assignments. Methodology 800 can be performed by, for example, a wireless network node and/or any other suitable network device. Methodology 800 can begin at block 802, wherein a persistent assignment associated with a network user is identified. Next, at block 804, a timescale associated with the persistent assignment is identified based on latency requirements of an application associated with the persistent assignment identified at block 802, anticipated backhaul latency between associated cooperating network nodes (e.g., latency of a backhaul link between serving cell(s) 110 and auxiliary cell(s) 120), and/or other factors. Methodology 800 can then conclude at block 806, wherein at least one transmission interval is selected (e.g., by a transmission interval manager 412) for cooperative transmissions to be conducted according to the persistent assignment identified at block 802 across respective cooperating network nodes based on the timescale identified at block 804.

Figure 9:
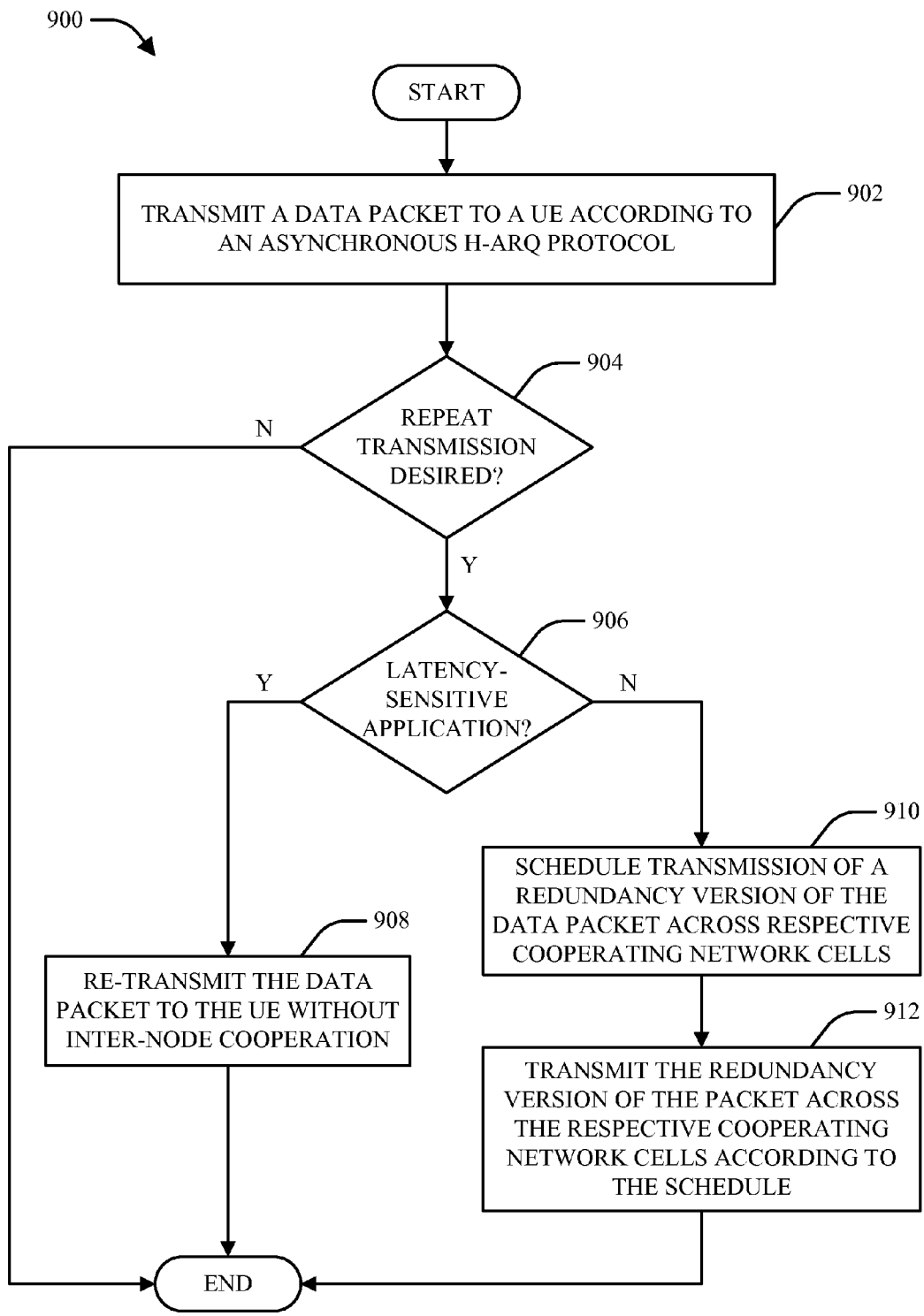

Referring next to FIG. 9, illustrated is a methodology 900 for coordinating a cooperative transmission pursuant to an asynchronous H-ARQ protocol. Methodology 900 can be performed by a network cell and/or any other appropriate network entity. Methodology 900 begins at block 902, wherein a data packet is transmitted to a UE according to an asynchronous H-ARQ protocol. Next, at block 904, it is determined whether a repeat transmission of the data packet is desired (e.g., based on feedback received from an ARQ feedback module 132). If no repeat transmission is desired, methodology 900 can conclude.

If a repeat transmission of the packet is determined at block 904 to be desired, methodology 900 can proceed to block 906, wherein methodology 900 can branch depending on whether an application associated with the packet is latency-sensitive. If the application is latency-sensitive, methodology 900 can conclude at block 908, wherein the packet is re-transmitted to the UE without inter-node cooperation. Alternatively, if the application is determined not to be latency sensitive, methodology 900 can instead proceed to blocks 910 and 912 prior to concluding. At block 910, transmission of a redundancy version of the packet across respective cooperating network cells can be scheduled (e.g., by a re-transmission coordinator 512). At block 912, the redundancy version of the packet can be transmitted across the respective cooperating network cells according to the schedule created at block 910.

Figure 10:
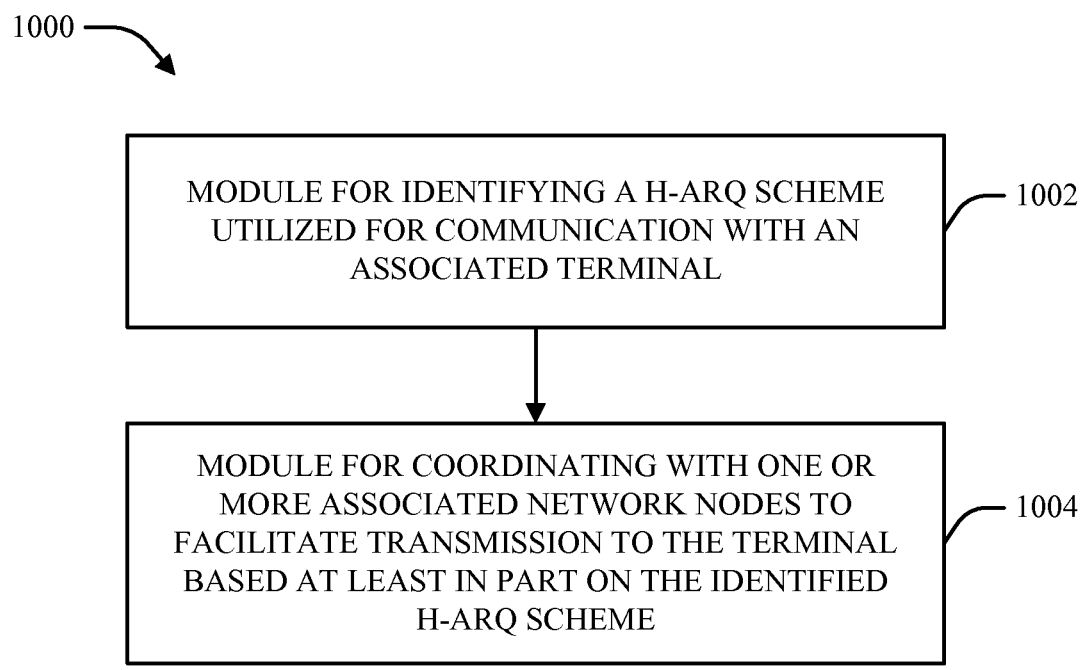
FIG. 10 is a block diagram of an apparatus that facilitates coordination of data transmission and/or re-transmission pursuant to a H-ARQ scheme.

Turning to FIG. 10, an apparatus 1000 that facilitates coordination of data transmission and/or re-transmission pursuant to a H-ARQ scheme is illustrated. It is to be appreciated that apparatus 1000 is represented as including functional blocks, which can be functional blocks that represent functions implemented by a processor, software, or combination thereof (e.g., firmware). Apparatus 1000 can be implemented by a network cell (e.g., a serving cell 110 and/or an auxiliary cell 120) and/or another suitable network entity and can include a module 1002 for identifying a H-ARQ scheme utilized for communication with an associated terminal and a module 1004 for coordinating with one or more associated network nodes to facilitate transmission to the terminal based at least in part on the identified H-ARQ scheme.

Figure 11:
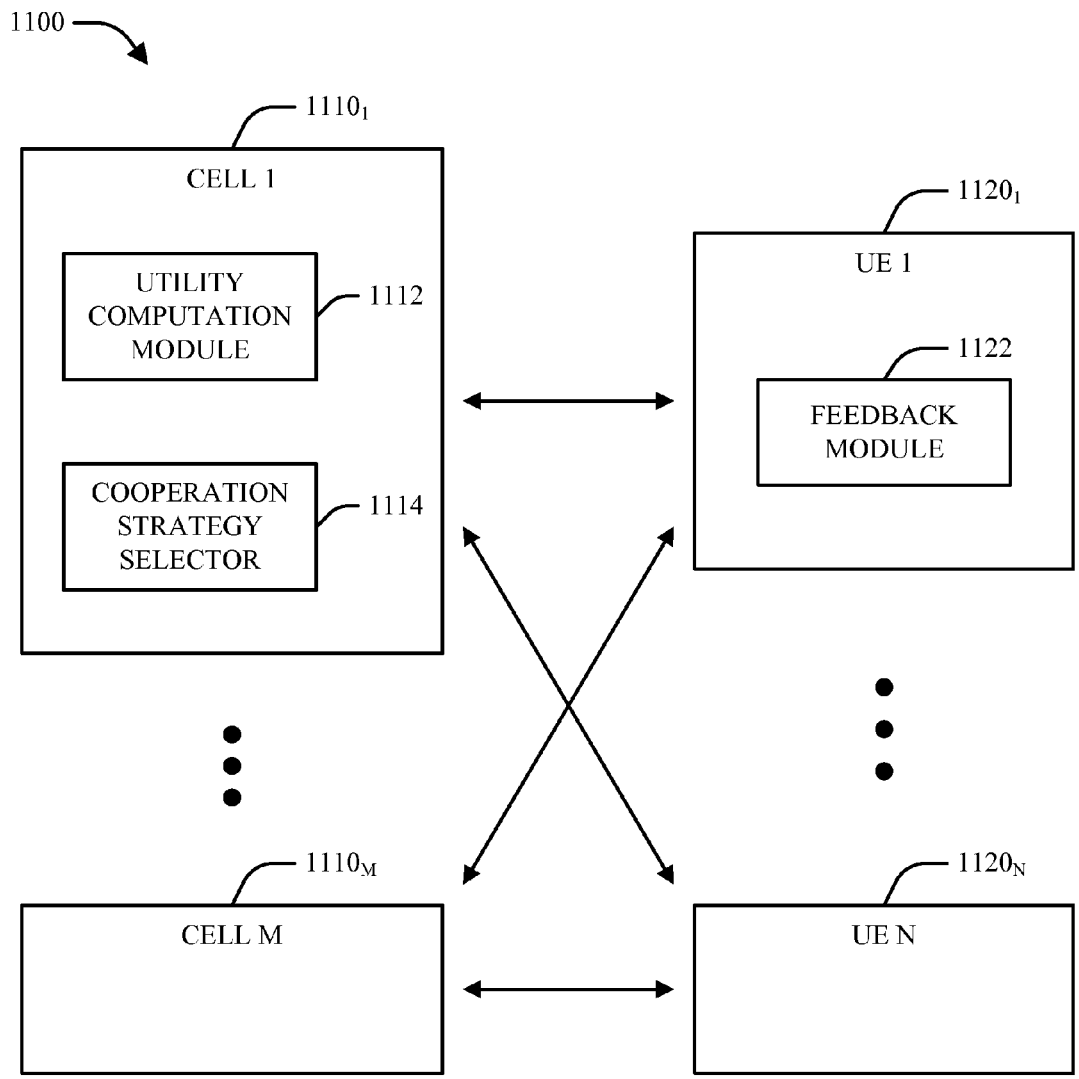
FIG. 11 is a block diagram of an example system that facilitates coordinated multipoint communication in accordance with various aspects described herein.

Referring now to FIG. 11, an example system 1100 that facilitates coordinated multipoint communication in accordance with various aspects is illustrated. As illustrated in FIG.

11, system 1100 can include one or more network cells 1110 and/or other network nodes, which can communicate with respective UEs 1120 as generally described herein.

In accordance with one aspect, respective cells 1110 in system 1100 can coordinate pursuant to one or more cooperation strategies in order to increase data rates associated with communication with a given UE 1120 and/or to reduce interference caused to other cells 1110 and/or UEs 1120 in system 1100. In one example, respective cells 1110 in system 1100 can be operable to utilize a plurality of cooperation techniques for transmission to one or more UEs 1120, such as coordinated silencing (CS), joint transmission (JT) via inter-eNodeB (inter-cell) packet sharing, coordinated beamforming (CBF), and/or any other suitable cell cooperation technique(s) as generally known in the art. In another example, various operational aspects of system 1100, such as respective cell cooperation techniques to be utilized for communication, cells 1110 to be utilized for such cooperation techniques, and respective UEs 1120 to be served via cooperative communication, can be controlled by a utility computation module 1112 and/or other suitable mechanisms of respective cells 1110. Further, determinations made by utility computation module 1112 can be supported at least in part by marginal utility calculations performed by one or more cells 1110 (e.g., via a utility computation module 1114) and/or any other suitable metric.

In general, a cooperation strategy selector 1114 can be utilized by a cell 1110 to compute and/or make scheduling decisions relating to node clustering, scheduling, forms of cooperative transmission to be utilized, and so on. A cooperation strategy can be selected by cooperation type selector 1114 based on factors such as UE mobility, carrier to interference (C/I) levels associated with respective UEs 120, capabilities of backhaul links between respective cells, or the like. By way of example, cooperation type selector 1114 can select CS and/or another similar simple form of cell cooperation in the case of high-mobility UEs and/or rapidly changing channel conditions associated with a given UE 1120. Additionally or alternatively, if mobility of a given UE 1120 is determined to be low, or a high degree of antenna correlation is present with respect to the UE 1120, more advanced cooperation techniques such as JT via inter-cell packet sharing (e.g., in the case of a relatively slow backhaul link between cells 1110) or CBF (e.g., in the case of a relatively fast backhaul link between cells 1110) can be selected. In another example, utility computation module 1112 and/or cooperation strategy selector 1114 can operate based at least in part on information obtained from respective UEs 1120 (e.g., via a feedback module 1122 at the respective UEs 1120).

In accordance with one aspect, a projected rate associated with respective UEs 1120 can be calculated (e.g., by utility computation module 1112) and leveraged with factors such as backhaul bandwidth, latency constraints, or the like, to select between respective cooperation techniques. For example, cooperation type selector 1112 can rule out a JT technique using backhaul bandwidth and latency uncertainty based on associated a priori and/or long-term backhaul link classifications. In another example, channel state information at the transmitter (CSIT) delivery delay and accuracy, as well as scheduling delay and/or other suitable factors, can be factored in projected rate calculation.

By way of specific example, cooperation type selector 1114 can utilize a set of cooperation technique selection rules as follows. First, cooperation type selector 1114 can rule out a JT technique based on a long-term backhaul link classification. Further, cooperation type selector 1114 can consider CBF techniques over JT in the event that a ratio of a combined energy C/I to the best node C/I is below a predefined threshold. In addition, if an associated channel prediction error is above a threshold value, cooperation type selector 1114 can consider CS (e.g., in the event that CBF and/or JT are possible).

In accordance with another aspect, utility computation module 1112 can compute per-UE projected rates based on various factors. These factors can include, for example, propagation channels for respective links involved in a utilized cooperation strategy (e.g., taking into account power and bandwidth resources allocated per link); channel prediction accuracy based on projected downlink estimation error at respective UEs 1120 and corresponding feedback delay; anticipated interference levels from cooperative and non-cooperative network nodes (e.g., cells 1110 and/or UEs 1120), taking into account spatial interference structures as applicable; and/or any other suitable factors. In one example, respective UEs 1120 in system 1100 can provide information relating to downlink estimation errors, feedback delay, UE processing loss, interference nulling capability, and/or other information relating to the operational capabilities of the respective UEs 1120 to respective cells 1110 via feedback module 1122 and/or any other suitable means.

In one example, utility computation module 1112 can perform utility computations for a given UE 1120 based on various requirements for channel state information at the transmitter (CSIT). CSIT requirements can vary, for example, based on a cooperation strategy employed by respective cells 1110 with respect to a given UE 1120. By way of specific example, it can be appreciated that CSIT requirements associated with iterative signal processing and/or CBF can differ substantially between CSIT requirements for CS. In one example, a cell 1110 can utilize an assumption of accurate CSIT at moderate to high post-processing carrier to interference (C/I) levels in order to employ first order approximation of an associated CSIT effect. Additionally or alternatively, in the event that a substantially high error effect (e.g., due to spatial error) is encountered, CS can be favored by cell 1110 over more complex signal processing techniques. In accordance with one aspect, a threshold at which CS is selected over such techniques can be based on an empirical measure of channel prediction, as described in further detail herein.

In accordance with a further aspect, cooperation strategy selector 1114 can utilize one or more strategy utility maximization techniques for optimizing a cooperation strategy to be utilized with respect to respective UEs 1120. For example, one or more iterative utility maximization algorithms (e.g., algorithms similar to iterative pricing) can be utilized, wherein an iterative search is performed at respective network nodes (e.g., cells 1110, sectors within cells 1110, etc.) for respective candidate cooperation strategies. In one example, various cooperation technique constraints can be considered, which can be, for example, reflected in constraints on the beam coefficients of various nodes. In another example, first order extension can be utilized to update respective beam weights at respective iterations until convergence. In various implementations, convergence can be made dependent on an algorithm starting point, which can be selected in a variety of manners. For example, a starting point can be selected via zero-forcing (ZF) across respective cooperating nodes, maximum ratio combining (MRC) and/or MMSE-based approaches, or the like. In one example, power allocation techniques can be applied in addition to ZF and/or MRC.

Figure 12:
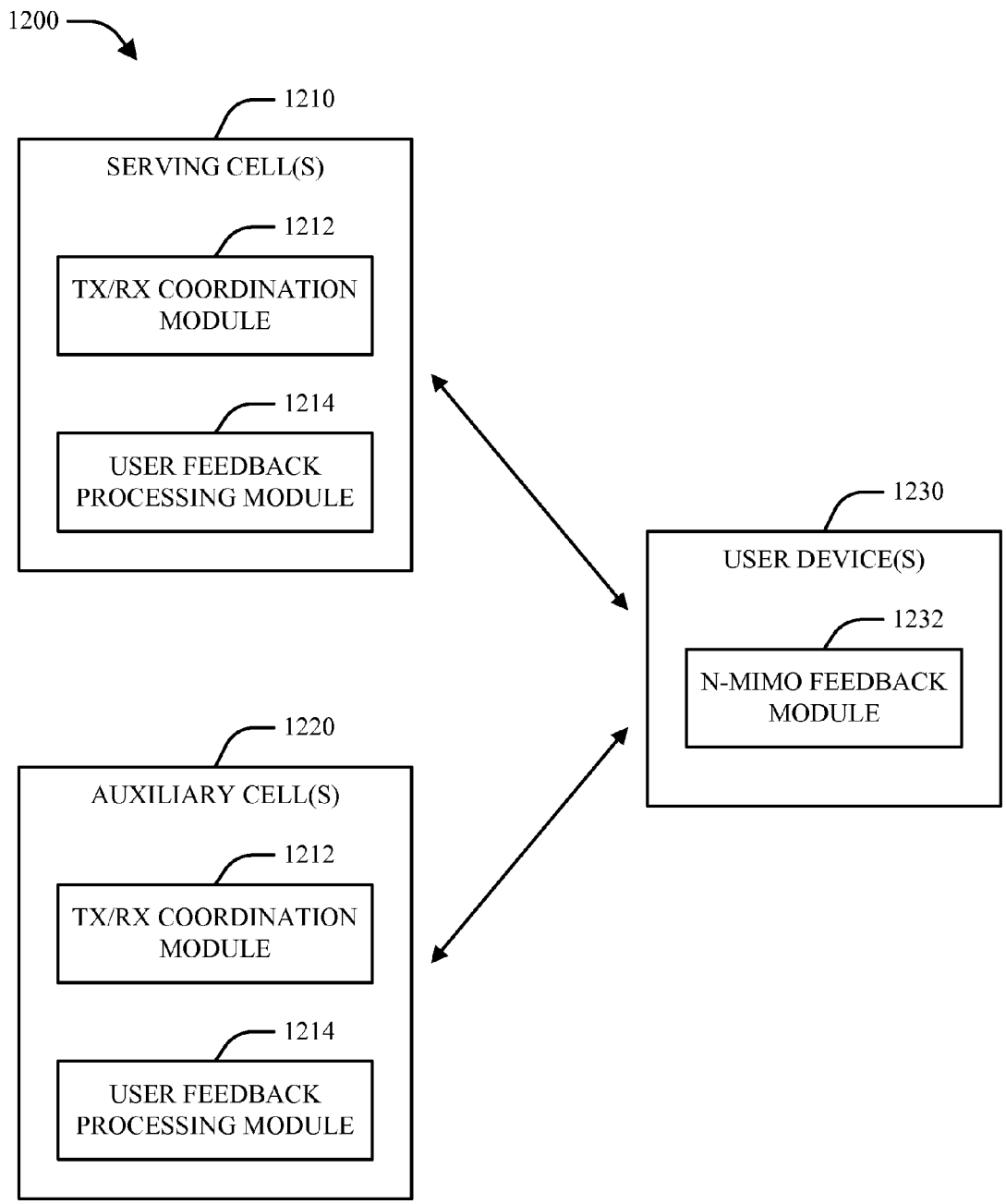
FIG. 12 illustrates another example system that can be utilized to facilitate cooperative multipoint communication in accordance with various aspects described herein.

Referring next to FIG. 12, an example system 1200 that facilitates cooperative multipoint communication in accordance with various aspects described herein is illustrated. As FIG. 12 illustrates, system 1200 can include respective user devices 1230 that can communicate with one or more associated network cells, such as serving cell(s) 1210 and auxiliary cell(s) 1220. In a similar manner to the preceding illustrations and description, it should be appreciated that no functionality of cells 1210-1220 is intended to be implied by such naming For example, an auxiliary cell 1220 can serve a user device 1230 by providing communication coverage for user device 1230 in addition to, or in place of, a serving cell 1210 in some cases.

In accordance with one aspect, respective serving cells 1210 and auxiliary cells 1220 can cooperate to perform N-MIMO or CoMP communication with one or more user devices 1230. For example, various techniques can be utilized to facilitate cooperation between respective cells 1210-1220, between respective sectors associated with one or more cells 1210-1220, and/or any other suitable network entities. Such cooperation can be facilitated by, for example, a TX/RX coordination module 1212 associated with respective cells 1210-1220 and/or any other suitable mechanism(s). Further, TX/RX coordination module 1212 can facilitate cooperation between respective network entities according to any suitable network cooperation strategy(ies), such as fractional frequency reuse, silencing, cooperative beamforming, joint transmission, or the like.

In one example, cooperative beamforming can be conducted between network nodes associated with respective cells 1210-1220 by coordinating transmissions from the respective cells 1210-1220 such that if a transmission to a user device 1230 occurs from a given cell 1210 or 1220, a beam is chosen to serve the user device 1230 by the given cell 1210 or 1220 such that the transmission to the user device 1230 is orthogonal or otherwise substantially mismatched to user devices scheduled on neighboring cells 1210 and/or 1220. By doing so, it can be appreciated that beamforming gains can be realized for a desired user device 1230 while simultaneously reducing the effects of interference on neighboring network devices. In one example, coordinated beamforming can be facilitated by performing scheduling, beam selection, user selection (e.g., by selecting user devices 1230 having desirable beams that substantially limit interference at neighboring devices), or the like.

Additionally or alternatively, joint transmission can be conducted between a plurality of network nodes and a given user device 1230 by, for example, pooling resources designated for transmission to a given user device 1230 and transmitting the pooled resources via multiple distinct network nodes (e.g., nodes corresponding to a serving cell 1210 as well as an auxiliary cell 1220). For example, instead of a first cell transmitting a modulation symbol x to a first user and a second cell transmitting a modulation symbol y to a second user, the cells can cooperate such that the first cell transmits ax+by to one or both of the users and the second cell transmits cx+dy to the same user(s), where a, b, c, and d are coefficients chosen to optimize the signal-to-noise ratio (SNR) of the users, system capacity, and/or any other suitable metric(s). In one example, resource pooling among network nodes corresponding to different cells 1210-1220 can be conducted via a backhaul link between the cells 1210-1220 and/or any other suitable mechanism. In another example, similar techniques can be utilized for uplink joint transmission, wherein a user device 1230 can be configured to transmit data, control signaling, and/or other appropriate information to multiple network nodes.

In accordance with one aspect, various aspects of uplink and downlink CoMP communication can be based on feedback provided by respective user devices 1230. For example, a N-MIMO feedback module 1232 at respective user devices 1230 can be utilized to provide feedback to various cells 1210-1220, which in turn can utilize a user feedback processing module 1214 and/or other suitable means to utilize the feedback in conducting cooperative communication within system 1200. By way of example, in the case of downlink CoMP communication, a N-MIMO feedback module 1232 at user device(s) 1230 can facilitate channel reporting to respective cells 1210-1220 of respective serving cells as well as one or more neighboring non-cooperative cells. By way of another example, in the case of uplink CoMP communication, N-MIMO feedback module 1232 can provide feedback information to respective cells 1210-1220 in combination with respectively scheduled uplink transmissions to the cells 1210-1220 that can be utilized by the cells 1210-1220 to facilitate the removal of interference from the corresponding uplink transmissions.

Figure 13:
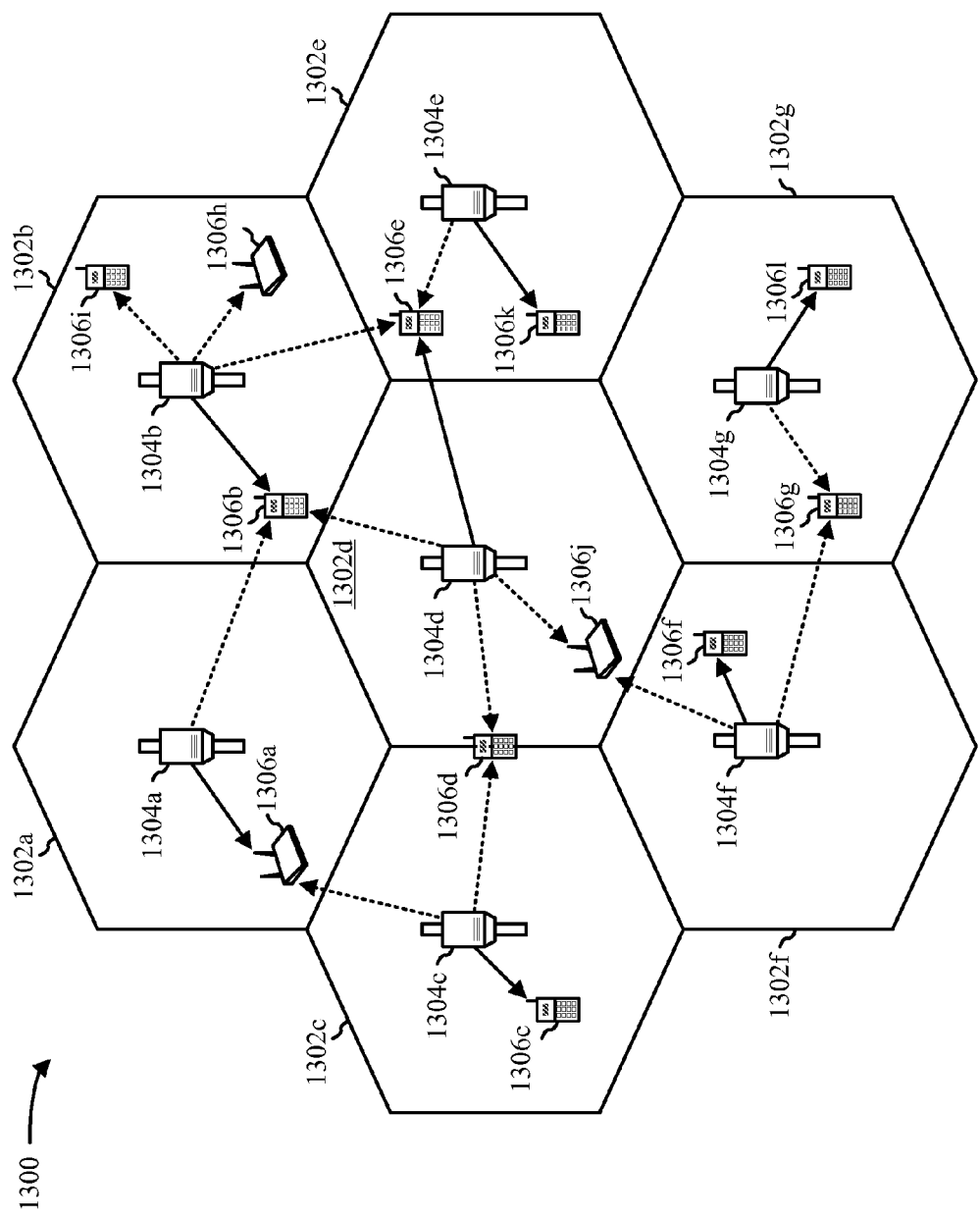
FIG. 13 illustrates an example wireless communication system in accordance with various aspects set forth herein.

Turning to FIG. 13, an exemplary wireless communication system 1300 is illustrated. In one example, system 1300 can be configured to support a number of users, in which various disclosed embodiments and aspects can be implemented. As shown in FIG. 13, by way of example, system 1300 can provide communication for multiple cells 1302, (e.g., macro cells 1302a-1302g), with respective cells being serviced by corresponding access points (AP) 1304 (e.g., APs 1304a-1304g). In one example, one or more cells can be further divided into respective sectors (not shown).

As FIG. 13 further illustrates, various access terminals (ATs) 1306, including ATs 1306a-1306k, can be dispersed throughout system 1300. In one example, an AT 1306 can communicate with one or more APs 1304 on a forward link (FL) and/or a reverse link (RL) at a given moment, depending upon whether the AT is active and whether it is in soft handoff and/or another similar state. As used herein and generally in the art, an AT 1306 can also be referred to as a user equipment (UE), a mobile terminal, and/or any other suitable nomenclature. In accordance with one aspect, system 1300 can provide service over a substantially large geographic region. For example, macro cells 1302a-1302g can provide coverage for a plurality of blocks in a neighborhood and/or another similarly suitable coverage area.

Figure 14:
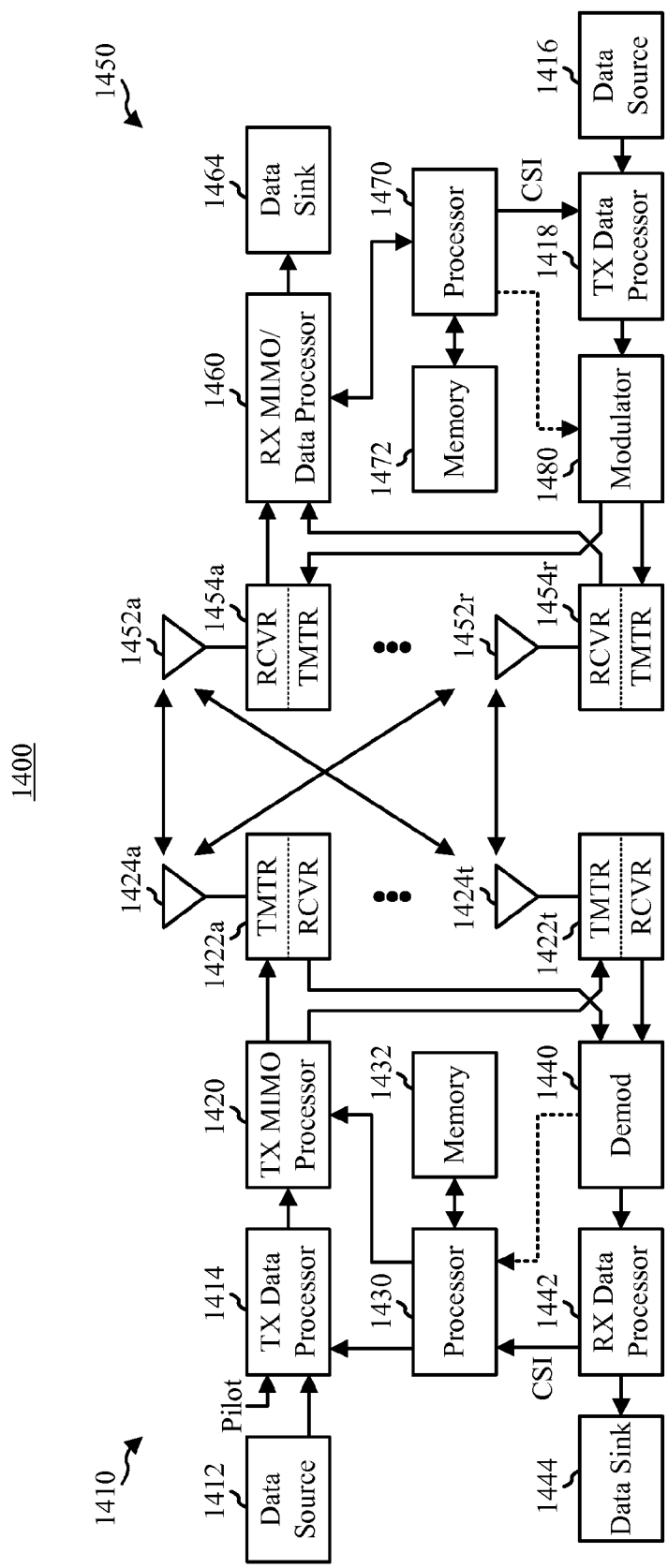
FIG. 14 is a block diagram illustrating an example wireless communication system in which various aspects described herein can function.

Referring now to FIG. 14, a block diagram illustrating an example wireless communication system 1400 in which various aspects described herein can function is provided. In one example, system 1400 is a multiple-input multiple-output (MIMO) system that includes a transmitter system 1410 and a receiver system 1450. It should be appreciated, however, that transmitter system 1410 and/or receiver system 1450 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 1410 and/or receiver system 1450 described herein could be utilized in connection with a single output to single input antenna system.

In accordance with one aspect, traffic data for a number of data streams are provided at transmitter system 1410 from a data source 1412 to a transmit (TX) data processor 1414. In one example, each data stream can then be transmitted via a respective transmit antenna 1424. Additionally, TX data processor 1414 can format, encode, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 1450 to estimate channel response. Back at transmitter system 1410, the multiplexed pilot and coded data for each data stream can be modulated (i.e., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 1430.

Next, modulation symbols for all data streams can be provided to a TX processor 1420, which can further process the modulation symbols (e.g., for OFDM). TX MIMO processor 1420 can then provides $N_T$ modulation symbol streams to $N_T$ transceivers 1422a through 1422t. In one example, each transceiver 1422 can receive and process a respective symbol stream to provide one or more analog signals. Each transceiver 1422 can then further condition (e.g., amplify, filter, and upconvert) the analog signals to provide a modulated signal suitable for transmission over a MIMO channel. Accordingly, $N_T$ modulated signals from transceivers 1422a through 1422t can then be transmitted from $N_T$ antennas 1424a through 1424t, respectively.

In accordance with another aspect, the transmitted modulated signals can be received at receiver system 1450 by $N_R$ antennas 1452a through 1452r. The received signal from each antenna 1452 can then be provided to respective transceivers 1454. In one example, each transceiver 1454 can condition (e.g., filter, amplify, and downconvert) a respective received signal, digitize the conditioned signal to provide samples, and then processes the samples to provide a corresponding "received" symbol stream. An RX MIMO/data processor 1460 can then receive and process the $N_R$ received symbol streams from $N_R$ transceivers 1454 based on a particular receiver processing technique to provide $N_T$ "detected" symbol streams. In one example, each detected symbol stream can include symbols that are estimates of the modulation symbols transmitted for the corresponding data stream. RX processor 1460 can then process each symbol stream at least in part by demodulating, deinterleaving, and decoding each detected symbol stream to recover traffic data for a corresponding data stream. Thus, the processing by RX processor 1460 can be complementary to that performed by TX MIMO processor 1420 and TX data processor 1414 at transmitter system 1410. RX processor 1460 can additionally provide processed symbol streams to a data sink 1464.

In accordance with one aspect, the channel response estimate generated by RX processor 1460 can be used to perform space/time processing at the receiver, adjust power levels, change modulation rates or schemes, and/or other appropriate actions. Additionally, RX processor 1460 can further estimate channel characteristics such as, for example, signal-to-noise-and-interference ratios (SNRs) of the detected symbol streams. RX processor 1460 can then provide estimated channel characteristics to a processor 1470. In one example, RX processor 1460 and/or processor 1470 can further derive an estimate of the "operating" SNR for the system. Processor 1470 can then provide channel state information (CSI), which can comprise information regarding the communication link and/or the received data stream. This information can include, for example, the operating SNR. The CSI can then be processed by a TX data processor 1418, modulated by a modulator 1480, conditioned by transceivers 1454a through 1454r, and transmitted back to transmitter system 1410. In addition, a data source 1416 at receiver system 1450 can provide additional data to be processed by TX data processor 1418.

Back at transmitter system 1410, the modulated signals from receiver system 1450 can then be received by antennas 1424, conditioned by transceivers 1422, demodulated by a demodulator 1440, and processed by a RX data processor 1442 to recover the CSI reported by receiver system 1450. In one example, the reported CSI can then be provided to processor 1430 and used to determine data rates as well as coding and modulation schemes to be used for one or more data streams. The determined coding and modulation schemes can then be provided to transceivers 1422 for quantization and/or use in later transmissions to receiver system 1450. Additionally and/or alternatively, the reported CSI can be used by processor 1430 to generate various controls for TX data processor 1414 and TX MIMO processor 1420. In another example, CSI and/or other information processed by RX data processor 1442 can be provided to a data sink 1444.

In one example, processor 1430 at transmitter system 1410 and processor 1470 at receiver system 1450 direct operation at their respective systems. Additionally, memory 1432 at transmitter system 1410 and memory 1472 at receiver system 1450 can provide storage for program codes and data used by processors 1430 and 1470, respectively. Further, at receiver system 1450, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

Figure 15:
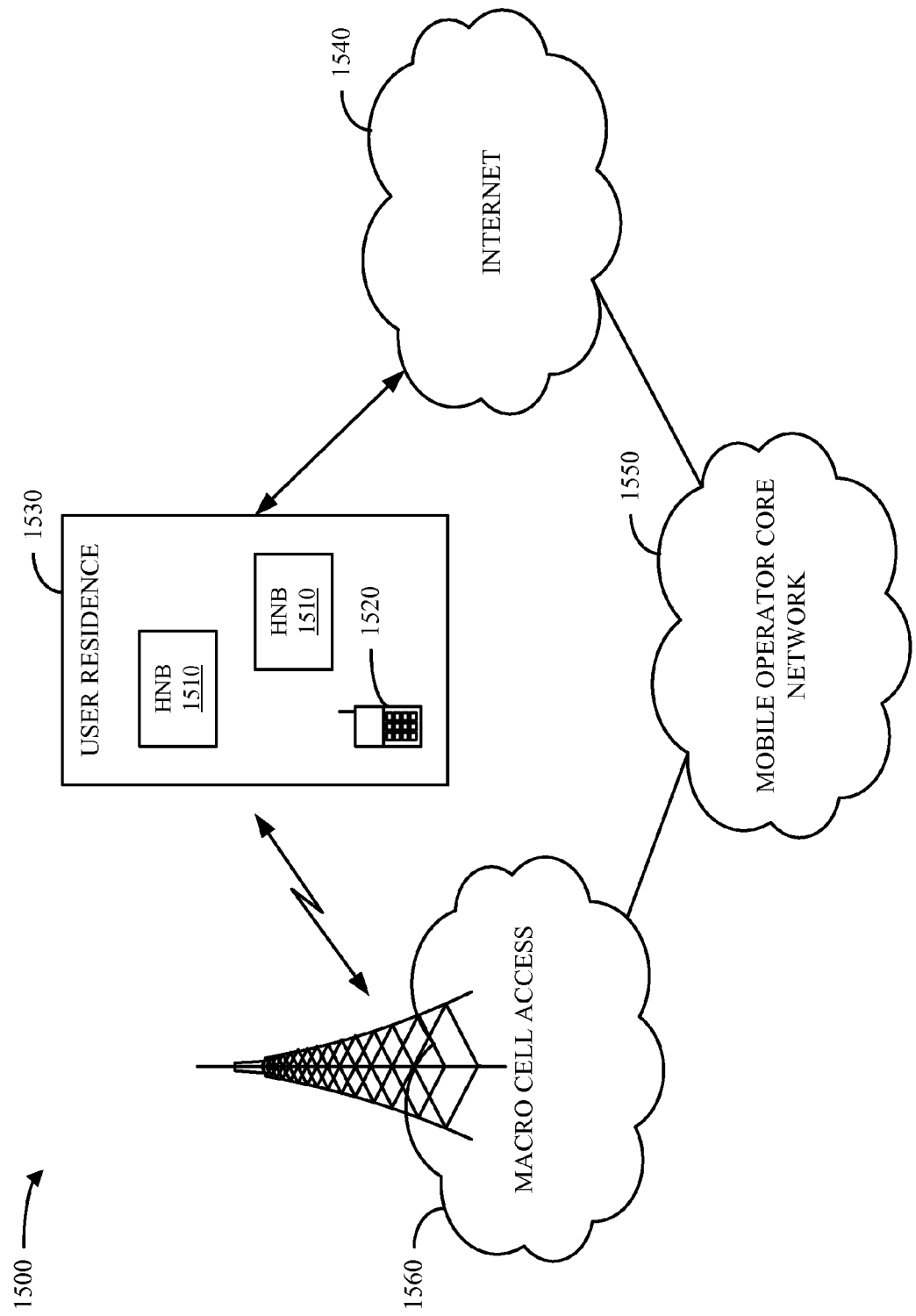
FIG. 15 illustrates an example communication system that enables deployment of access point base stations within a network environment.

FIG. 15 illustrates an example communication system 1500 that enables deployment of access point base stations within a network environment. As shown in FIG. 15, system 1500 can include multiple access point base stations (e.g., femto cells or Home Node B units (HNBs)) such as, for example, HNBs 1510. In one example, respective HNBs 1510 can be installed in a corresponding small scale network environment, such as, for example, one or more user residences 1530. Further, respective HNBs 1510 can be configured to serve associated and/or alien UE(s) 1520. In accordance with one aspect, respective HNBs 1510 can be coupled to the Internet 1540 and a mobile operator core network 1550 via a DSL router, a cable modem, and/or another suitable device (not shown). In accordance with one aspect, an owner of a femto cell or HNB 1510 can subscribe to mobile service, such as, for example, 3G/4G mobile service, offered through mobile operator core network 1550. Accordingly, UE 1520 can be enabled to operate both in a macro cellular environment 1560 and in a residential small scale network environment.

In one example, UE 1520 can be served by a set of Femto cells or HNBs 1510 (e.g., HNBs 1510 that reside within a corresponding user residence 1530) in addition to a macro cell mobile network 1560. As used herein and generally in the art, a home femto cell is a base station on which an AT or UE is authorized to operate on, a guest femto cell refers to a base station on which an AT or UE is temporarily authorized to operate on, and an alien femto cell is a base station on which the AT or UE is not authorized to operate on. In accordance with one aspect, a femto cell or HNB 1510 can be deployed on a single frequency or on multiple frequencies, which may overlap with respective macro cell frequencies.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method, comprising:
    identifying a Hybrid Automatic Repeat Request (H-ARQ) protocol to be utilized for communication with one or more users; and
    selecting a cooperation strategy to be utilized across multiple network nodes for communication with the one or more users, the selecting being based at least in part on the H-ARQ protocol, wherein the cooperation strategy includes a determination, based on operation of the H-ARQ protocol, of when the multiple network nodes will participate in coordinated multipoint (CoMP) communication with the one or more users and when the multiple network nodes will not participate in CoMP communication with the one or more users.

2. The method of claim 1, wherein the identifying comprises identifying a synchronous H-ARQ protocol to be utilized for communication with one or more users.

3. The method of claim 2, wherein the selecting comprises:
    configuring respective initial H-ARQ transmissions to be conducted in a cooperative manner across a plurality of cooperating network nodes; and
    configuring respective H-ARQ re-transmissions to occur without inter-node cooperation.

4. The method of claim 3, wherein:
    the selecting further comprises scheduling respective transmission instances in advance of communication with the one or more users; and
    the configuring respective initial H-ARQ transmissions comprises configuring the respective initial H-ARQ transmissions to occur on the respective transmission instances.

5. The method of claim 2, wherein the selecting comprises:
    determining whether a transmission to a given user is pre-schedulable;
    configuring the transmission to be conducted in a cooperative manner across a plurality of cooperating network nodes upon determining that the transmission is pre-schedulable; and
    configuring the transmission to occur without inter-node cooperation upon determining that the transmission is not pre-schedulable.

6. The method of claim 1, wherein the identifying comprises identifying a H-ARQ protocol to be utilized in combination with persistent assignments associated with one or more users.

7. The method of claim 6, wherein the selecting comprises:
    identifying one or more timescales associated with a persistent assignment for a given user; and
    selecting one or more transmission intervals for cooperative transmissions to the given user based at least in part on the one or more timescales.

8. The method of claim 7, wherein the identifying one or more timescales comprises identifying one or more timescales based on at least one of latency requirements of an application associated with the persistent assignment or latency of a backhaul link associated with respective associated network nodes.

9. The method of claim 7, wherein the selecting further comprises:
    selecting a plurality of transmission intervals for cooperative transmissions to the given user; and
    selecting a transmission interval from the plurality of transmission intervals based at least in part on a buffer level associated with the given user.

10. The method of claim 1, wherein the selecting comprises:
    configuring a first transmission interval and a second transmission interval, wherein the second transmission interval is longer than the first transmission interval; and
    selecting a transmission interval for cooperative communication across respective network nodes from the first transmission interval and the second transmission interval based at least in part on timing requirements associated with at least one of the one or more users or the respective network nodes.

11. The method of claim 10, wherein the selecting a transmission interval comprises selecting the first transmission interval upon determining that a buffer level of the one or more users is of a size such that termination of a persistent assignment is unlikely, that user latency requirements dictate selecting the shorter of the first and second transmission intervals, or that a resource assignment associated with the one or more users is small enough to limit wastage in the case of lost inter-node coordination.

12. The method of claim 10, wherein the selecting a transmission interval comprises selecting the second transmission interval upon determining that expiration of a buffer associated with the one or more users is imminent or that a time interval between respective transmissions conducted by the respective network nodes is configured to be sufficiently large to support coordinated re-transmissions.

13. The method of claim 1, wherein the identifying comprises identifying an asynchronous H-ARQ protocol to be utilized for communication with one or more users.

14. The method of claim 13, further comprising transmitting a data packet to one or more users and identifying a request for re-transmission of the data packet, wherein the selecting further comprises scheduling re-transmission of the data packet as a function of latency sensitivity of an application associated with the data packet.

15. The method of claim 14, wherein the selecting further comprises scheduling re-transmission of the data packet without inter-node cooperation upon determining that the application associated with the data packet is a latency-sensitive application.

16. The method of claim 14, wherein the selecting further comprises scheduling cooperative transmission of a redundancy version of the data packet across a plurality of network nodes upon determining that the application associated with the data packet is not a latency-sensitive application.

17. A wireless communications apparatus, comprising:
a memory that stores data relating to a user equipment unit (UE) served by the wireless communications apparatus and a Hybrid Automatic Repeat Request (H-ARQ) protocol configured for communication with the UE; and
a processor configured to configure a cooperation strategy to be utilized by the wireless communications apparatus and one or more associated network nodes for communication with the UE based at least in part on the H-ARQ protocol configured for communication with the UE, wherein the cooperation strategy includes a determination, based on operation of the H-ARQ protocol, of when the multiple network nodes will participate in coordinated multipoint (CoMP) communication with the one or more users and when the multiple network nodes will not participate in CoMP communication with the one or more users.

18. The wireless communications apparatus of claim 17, wherein the H-ARQ protocol configured for communication with the UE is a synchronous H-ARQ protocol.

19. The wireless communications apparatus of claim 18, wherein the processor is further configured to facilitate respective initial transmissions to the UE in cooperation with one or more associated network nodes and to facilitate respective re-transmissions to the UE without cooperation from associated network nodes.

20. The wireless communications apparatus of claim 19, wherein the processor is further configured to pre-schedule a set of transmission instances and to facilitate respective initial transmissions to the UE on transmission instances in the set of transmission instances.

21. The wireless communications apparatus of claim 18, wherein the processor is further configured to classify respective transmissions to the UE as advance schedulable or non-advance schedulable, to facilitate respective advance schedulable transmissions to the UE in cooperation with one or more associated network nodes, and to facilitate respective non-advance schedulable transmissions to the UE without cooperation from associated network nodes.

22. The wireless communications apparatus of claim 17, wherein the H-ARQ protocol configured for communication with the UE is associated with one or more persistent resource assignments designated for the UE.

23. The wireless communications apparatus of claim 22, wherein the processor is further configured to identify one or more timescales associated with a persistent resource assignment to the UE based on at least one of latency requirements of an application associated with the persistent resource assignment or latency of a backhaul link between the wireless communications apparatus and at least one associated network node and to compute at least one transmission interval for communication with the UE based on the one or more timescales.

24. The wireless communications apparatus of claim 23, wherein the processor is further configured to compute a plurality of transmission intervals for communication with the UE and to select a transmission interval from the plurality of transmission intervals based at least in part on a buffer level associated with the UE.

25. The wireless communications apparatus of claim 17, wherein:
the memory further stores data relating to a first transmission interval and a second transmission interval that is longer than the first transmission interval; and
the processor is further configured to select the first transmission interval or the second transmission interval for cooperative communication by the wireless communications apparatus and one or more associated network nodes based at least in part on timing requirements associated with the UE, the wireless communications apparatus, or the one or more associated network nodes.

26. The wireless communications apparatus of claim 25, wherein the processor is further configured to select the first transmission interval upon determining that a buffer level of the UE is of a size such that termination of a persistent assignment is unlikely, that UE latency requirements require use of the first transmission interval, or that a resource assignment for the UE is small enough to limit wastage in the case of lost inter-node coordination, or to select the second transmission interval upon determining that expiration of a buffer associated with the UE is imminent or that a time interval between respective transmissions conducted by the wireless communications apparatus and the one or more associated network nodes is configured to be sufficiently large to support coordinated re-transmissions.

27. The wireless communications apparatus of claim 17, wherein the H-ARQ protocol configured for communication with the UE is an asynchronous H-ARQ protocol.

28. The wireless communications apparatus of claim 27, wherein the processor is further configured to conduct a transmission to the UE, to identify a request for repetition of the transmission from the UE, and to configure a cooperation strategy to be utilized for repetition of the transmission based at least in part on latency sensitivity of an application associated with the transmission.

29. The wireless communications apparatus of claim 28, wherein the processor is further configured to facilitate repetition of the transmission without inter-node cooperation upon determining that the application associated with the transmission is a latency-sensitive application.

30. The wireless communications apparatus of claim 28, wherein the processor is further configured to facilitate repetition of the transmission in cooperation with one or more associated network nodes upon determining that the application associated with the transmission is not a latency-sensitive application.

31. An apparatus, comprising:
means for identifying a Hybrid Automatic Repeat Request (H-ARQ) scheme utilized for communication with an associated terminal; and
means for coordinating the apparatus with one or more associated network nodes to facilitate transmission to the associated terminal, wherein a cooperation strategy to be used by the apparatus and the one or more associated network nodes in communicating with the associated terminal is selected based at least in part on the H-ARQ scheme utilized for communication with the associated terminal, wherein the cooperation strategy includes a determination, based on operation of the H-ARQ protocol, of when the multiple network nodes will participate in coordinated multipoint (CoMP) communication with the one or more users and when the multiple network nodes will not participate in CoMP communication with the one or more users.

32. The apparatus of claim 31, wherein the H-ARQ scheme utilized for communication with the associated terminal is a synchronous H-ARQ scheme.

33. The apparatus of claim 32, wherein the means for coordinating comprises:
means for scheduling respective initial transmissions to the associated terminal to be conducted in cooperation with the one or more associated network nodes; and
means for scheduling respective repeat transmissions to the associated terminal to be conducted without cooperation from the one or more associated network nodes.

34. The apparatus of claim 33, wherein:
the apparatus further comprises means for scheduling respective transmission instances in advance of communication with the associated terminal; and
the means for scheduling respective initial transmissions comprises means for configuring respective initial transmissions to occur on the respective transmission instances.

35. The apparatus of claim 32, wherein the means for coordinating comprises:
means for determining whether a transmission to the associated terminal is pre-schedulable;
means for scheduling the transmission to be conducted in cooperation with the one or more associated network nodes upon determining that the transmission is pre-schedulable; and
means for scheduling the transmission to be conducted without cooperation from the one or more associated network nodes upon determining that the transmission is not pre-schedulable.

36. The apparatus of claim 31, wherein the H-ARQ scheme utilized for communication with the associated terminal leverages a persistent assignment of resources designated for the associated terminal.

37. The apparatus of claim 36, wherein the means for coordinating comprises:
means for determining respective timescales associated with the persistent assignment based on at least one of latency requirements of an application associated with the persistent assignment or latency of a backhaul link between the apparatus and respective associated network nodes; and
means for computing one or more time intervals for communication with the associated terminal based at least in part on the respective timescales.

38. The apparatus of claim 37, wherein the means for coordinating further comprises:
means for computing a plurality of time intervals for communication with the associated terminal; and
means for selecting a time interval for communication with the associated terminal based at least in part on a buffer level of the associated terminal.

39. The apparatus of claim 31, wherein the H-ARQ scheme utilized for communication with the associated terminal is an asynchronous H-ARQ scheme.

40. The apparatus of claim 39, wherein:
the apparatus further comprises means for conducting a transmission to the associated terminal and means for identifying a request for repetition of the transmission from the associated terminal; and
the means for coordinating comprises means for coordinating with one or more associated network nodes to facilitate repetition of the transmission based at least in part on latency sensitivity of an application associated with the transmission.

41. A computer program product, comprising:
a non-transitory computer-readable medium, comprising:
code for causing a computer to identify a Hybrid Automatic Repeat Request (H-ARQ) scheme utilized for communication with a user equipment unit (UE); and
code for causing the computer to coordinate with one or more associated network nodes to facilitate transmission to the UE and further for selecting a cooperation strategy to be used by the computer and the one or more associated network nodes in communication with the UE, the selecting being based at least in part on the H-ARQ scheme utilized for communication with the UE, wherein the cooperation strategy includes a determination, based on operation of the H-ARQ protocol, of when the multiple network nodes will participate in coordinated multipoint (CoMP) communication with the one or more users and when the multiple network nodes will not participate in CoMP communication with the one or more users.

42. The computer program product of claim 41, wherein the H-ARQ scheme utilized for communication with the UE is a synchronous H-ARQ scheme.

43. The computer program product of claim 42, wherein the code for causing a computer to coordinate comprises:
code for causing a computer to schedule respective initial transmissions to the UE in cooperation with the one or more associated network nodes; and
code for causing a computer to schedule respective repeat transmissions to the UE without cooperation from the one or more associated network nodes.

44. The computer program product of claim 43, wherein:
the computer-readable medium further comprises code for causing a computer to schedule respective transmission instances in advance of communication with the UE; and
the code for causing a computer to schedule respective initial transmissions comprises code for causing a computer to schedule respective initial transmissions on the respective transmission instances.

45. The computer program product of claim 42, wherein the code for causing a computer to coordinate comprises:
code for causing a computer to determine whether a transmission to the UE is pre-schedulable;
code for causing a computer to schedule the transmission in cooperation with the one or more associated network nodes upon determining that the transmission is pre-schedulable; and
code for causing a computer to schedule the transmission without cooperation from the one or more associated network nodes upon determining that the transmission is not pre-schedulable.

46. The computer program product of claim 41, wherein the H-ARQ scheme utilized for communication with the UE leverages a persistent assignment of resources designated for the UE.

47. The computer program product of claim 46, wherein the code for causing a computer to coordinate comprises:
code for causing a computer to determine respective timescales associated with the persistent assignment based on at least one of latency requirements of an application associated with the persistent assignment or latency of a backhaul link between the apparatus and respective associated network nodes; and code for causing a computer to calculate one or more time intervals for communication with the UE based at least in part on the respective timescales.

48. The computer program product of claim 47, wherein the code for causing a computer to coordinate further comprises:
 code for causing a computer to calculate a plurality of time intervals for communication with the UE; and
 code for causing a computer to select a time interval for communication with the UE based at least in part on a buffer level of the UE.

49. The computer program product of claim 41, wherein the H-ARQ scheme utilized for communication with the UE is an asynchronous H-ARQ scheme.

50. The computer program product of claim 49, wherein:
 the computer-readable medium further comprises code for causing a computer to conduct a transmission to the UE and code for causing a computer to identify a request for repetition of the transmission from the UE; and
 the code for causing a computer to coordinate comprises code for causing a computer to coordinate with one or more associated network nodes to facilitate repetition of the transmission based at least in part on latency sensitivity of an application associated with the transmission.

* * * * *